(12) United States Patent
Nakatsui et al.

(10) Patent No.: US 11,692,134 B2
(45) Date of Patent: Jul. 4, 2023

(54) METHOD FOR PRODUCING INP QUANTUM DOT PRECURSOR AND METHOD FOR PRODUCING INP-BASED QUANTUM DOT

(71) Applicant: NIPPON CHEMICAL INDUSTRIAL CO., LTD., Tokyo (JP)

(72) Inventors: Kazuhiro Nakatsui, Tokyo (JP); Taiki Tsuzukiishi, Tamura-gun (JP); Tomo Sakanoue, Tokyo (JP)

(73) Assignee: NIPPON CHEMICAL INDUSTRIAL CO., LTD., Tokyo (JP)

( * ) Notice: Subject to any disclaimer, the term of this patent is extended or adjusted under 35 U.S.C. 154(b) by 70 days.

(21) Appl. No.: 17/601,753

(22) PCT Filed: Mar. 26, 2020

(86) PCT No.: PCT/JP2020/013797
§ 371 (c)(1),
(2) Date: Oct. 6, 2021

(87) PCT Pub. No.: WO2020/213365
PCT Pub. Date: Oct. 22, 2020

(65) Prior Publication Data
US 2022/0195299 A1 Jun. 23, 2022

(30) Foreign Application Priority Data

Apr. 16, 2019 (JP) ................................ 2019-078007
Dec. 6, 2019 (JP) ................................ 2019-221374

(51) Int. Cl.
| | |
|---|---|
| *C09K 11/70* | (2006.01) |
| *C01B 25/08* | (2006.01) |
| *C07F 9/06* | (2006.01) |
| *C09K 11/08* | (2006.01) |
| *B82Y 20/00* | (2011.01) |
| *B82Y 40/00* | (2011.01) |

(52) U.S. Cl.
CPC ............ *C09K 11/70* (2013.01); *C01B 25/087* (2013.01); *C07F 9/06* (2013.01); *C09K 11/0883* (2013.01); *B82Y 20/00* (2013.01); *B82Y 40/00* (2013.01); *C01P 2004/64* (2013.01)

(58) Field of Classification Search
CPC ................ C09K 11/0883; C09K 11/70; C01B 25/087; B82Y 20/00; B82Y 40/00
See application file for complete search history.

(56) References Cited

U.S. PATENT DOCUMENTS

| | | |
|---|---|---|
| 2011/0017951 A1 | 1/2011 | Ryowa |
| 2017/0009134 A1 | 1/2017 | Daniels et al. |
| 2018/0258553 A1 | 9/2018 | Ono |
| 2019/0263845 A1 | 8/2019 | Takubo et al. |

FOREIGN PATENT DOCUMENTS

| | | |
|---|---|---|
| JP | 2011-26472 A | 2/2011 |
| JP | 2015-209524 A | 11/2015 |
| JP | 2016-517454 A | 6/2016 |
| WO | 2017/082116 A1 | 5/2017 |
| WO | 2018/061869 A1 | 4/2018 |
| WO | WO 2019/188679 | * 10/2019 |

OTHER PUBLICATIONS

Gary et al., "Two-Step Nucleation and Growth of InP Quantum Dots via Magic-Sized Cluster Intermediates", Chemistry of Materials, 2015, vol. 27, No. 4, pp. 1432-1441, cited in Specification and ISR (10 pages).
Ritchhart et al., "Templated Growth of InP Nanocrystals with a Polytwistane Structure", Angewandte Chemie, International Edition, 2018, vol. 57, No. 7, pp. 1908-1912, cited in Specification (5 pages).
Ning et al., "Magic size InP and InAs clusters: synthesis, characterization and shell growth", Chemical Communications, 2017, vol. 53, No. 17, pp. 2626-2629, cited in Specification and ISR (4 pages).
Ritchhart et al., "Templated Growth of InP Nanocrystals with a Polytwistane Structure", Angewandte Chemie, 2018, vol. 130, pp. 1926-1930, w/Supporting Information, cited in ISR (35 pages).
International Search Report dated Jun. 16, 2020, issued in counterpart International Application No. PCT/JP2020/013797 (3 pages).

* cited by examiner

*Primary Examiner* — C Melissa Koslow
(74) *Attorney, Agent, or Firm* — WHDA, LLP

(57) ABSTRACT

The present invention relates to a method for producing an InP-based quantum dot precursor from a phosphorus source and an indium source, in which a silylphosphine compound represented by the following Formula (1) with a content of a compound represented by the following Formula (2) of 0.3 mol % or less is used as the phosphorus source. Further, the present invention provides a method for producing an InP-based quantum dot comprising heating an InP quantum dot precursor to a temperature of 200° C. or more and 350° C. or less to obtain an InP quantum dot.

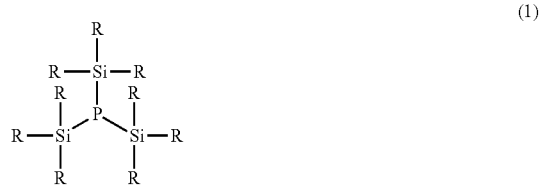

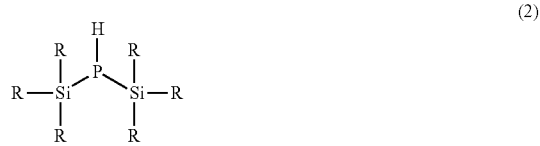

(R is as defined in the specification.)

18 Claims, 4 Drawing Sheets

[Figure 1(a)]
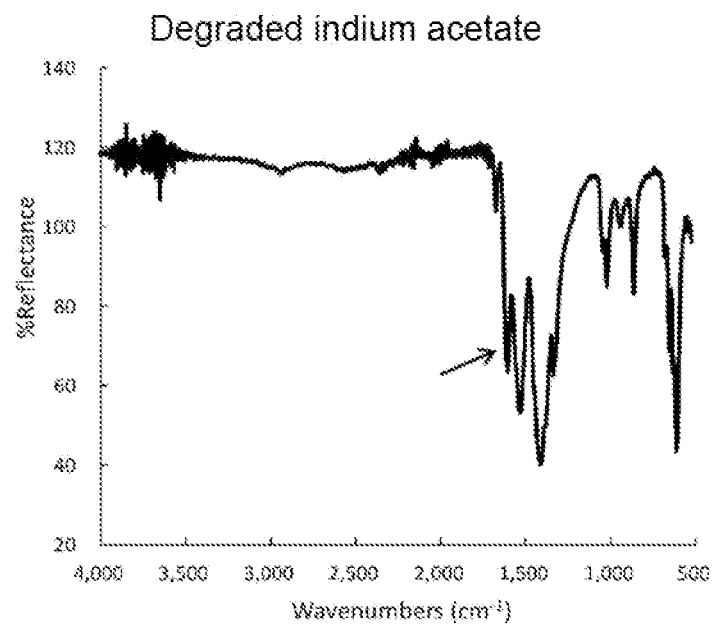
[Figure 1(b)]
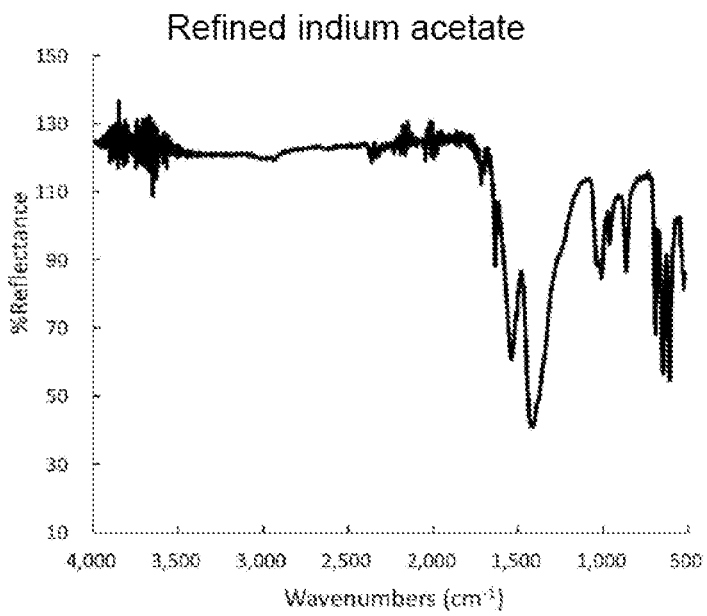

[Figure 2]
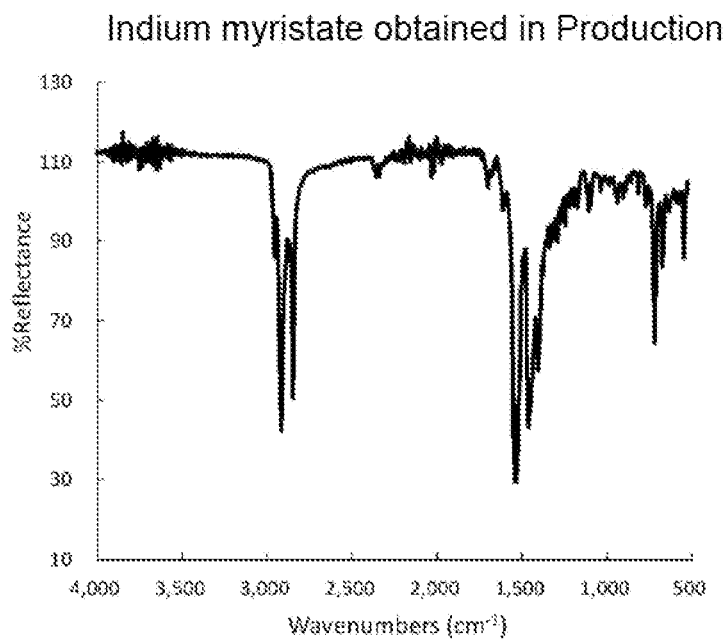
[Figure 3]
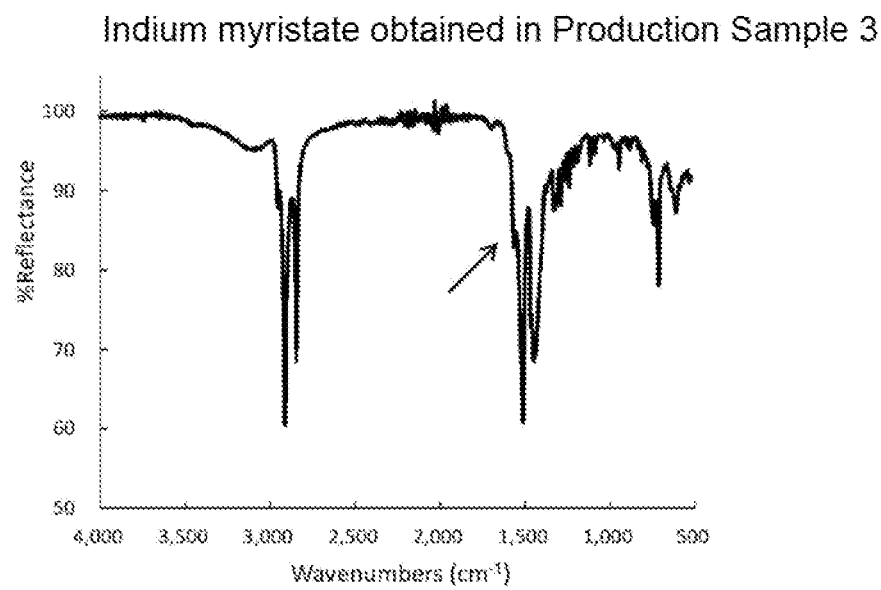

[Figure 4]
InP quantum dot precursor obtained in Example 1
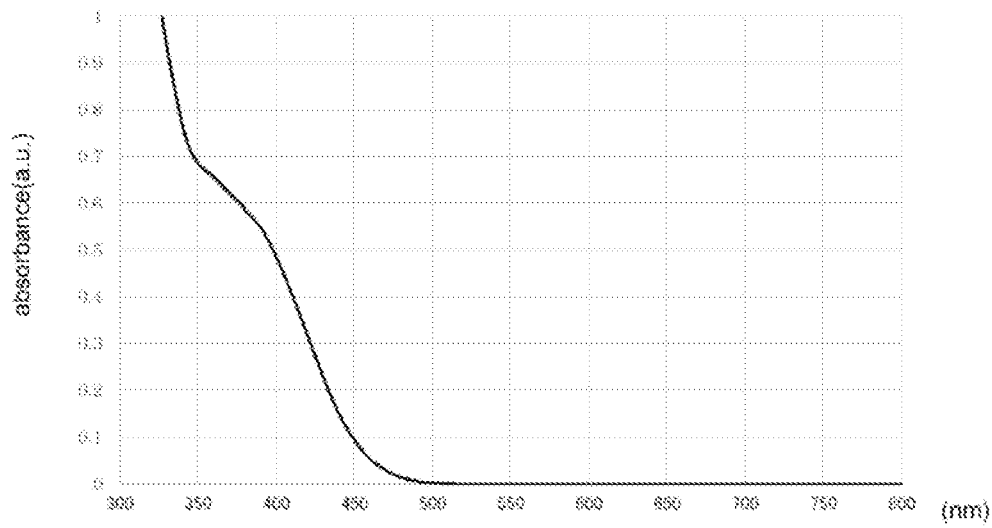
[Figure 5]
InP quantum dot obtained in Example 1
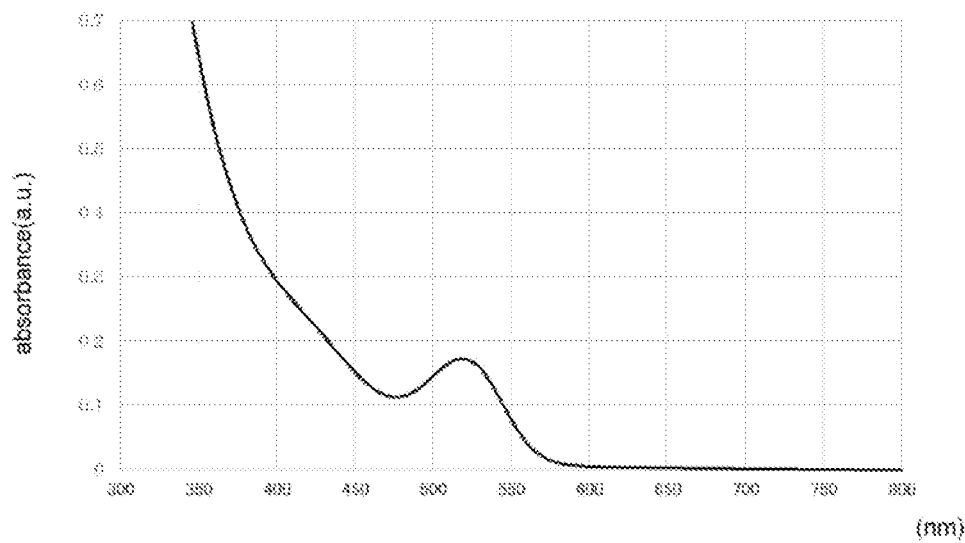

[Figure 6]
InP quantum dot precursor obtained in Example 3
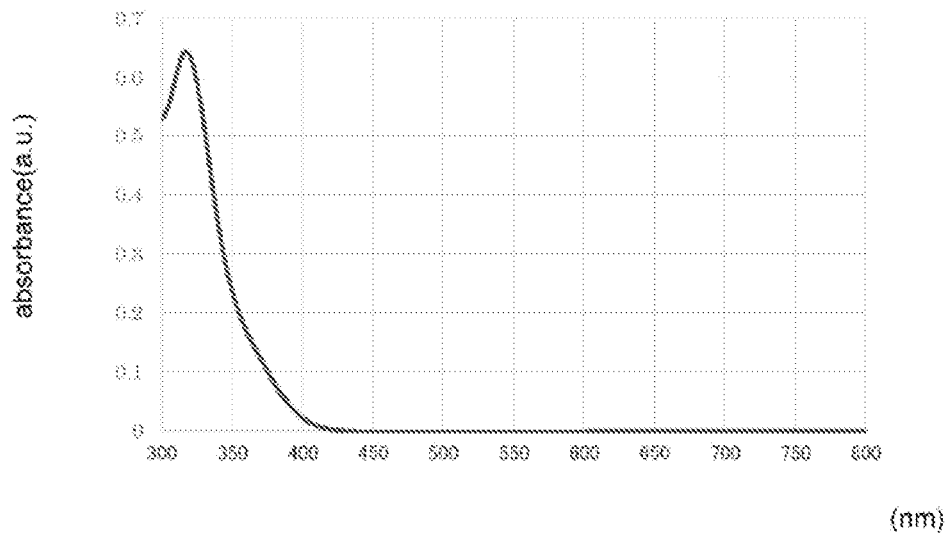
(nm)
[Figure 7]
InP quantum dot obtained in Example 3
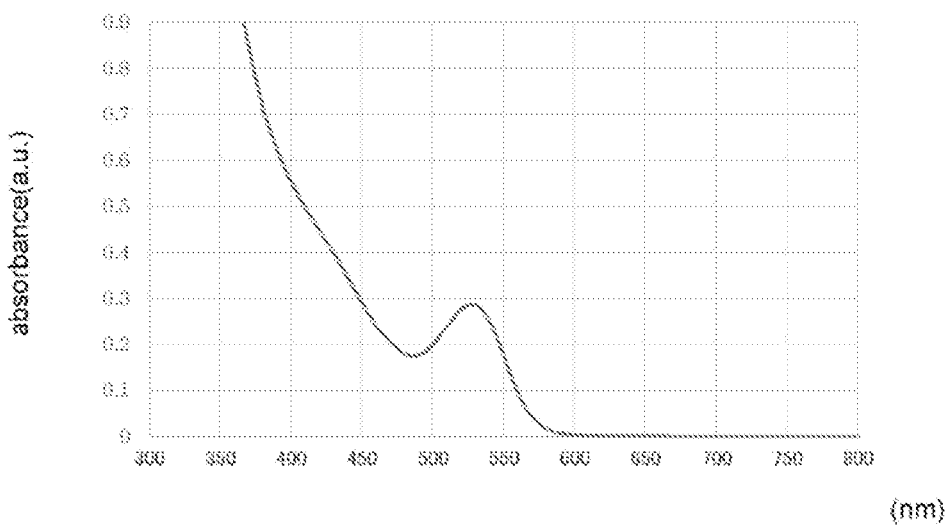
(nm)

METHOD FOR PRODUCING INP QUANTUM DOT PRECURSOR AND METHOD FOR PRODUCING INP-BASED QUANTUM DOT

TECHNICAL FIELD

The present invention relates to a method for producing an InP quantum dot precursor and a method for producing an InP-based quantum dot using the InP quantum dot precursor.

BACKGROUND ART

In recent years, development of quantum dots as light emitting material has progressed. As typical quantum dots, cadmium-based quantum dots such as CdSe, CdTe, and CdS have been developed from the viewpoint of excellent emission characteristics, etc. However, due to high toxicity and environmental load of cadmium, a cadmium-free quantum dot is expected to be developed.

Examples of the cadmium-free quantum dot include an InP (indium phosphide)-based quantum dot. In production of an InP-based quantum dot, phosphine, an aminophosphine compound, a silylphosphine compound, etc., are often used as a phosphorus source as a raw material. Among these, a method using a tertiary phosphine such as tris(trimethylsilyl)phosphine as a silylphosphine compound has been proposed (for example, Patent Literatures 1 to 3).

The method described in Patent Literatures 1 to 3 is a method for directly obtaining an InP quantum dot that is a nanoparticle. A method for obtaining an InP quantum dot from an InP quantum dot precursor including a specific extremely small number of constituent atoms as subdivision of an InP quantum dot has also been proposed (for example, Non Patent Literatures 1 to 3). The InP quantum dot precursor refers to also as a magic size cluster as described in Non Patent Literatures 1 to 3, depending on the number of constituent atoms, and exhibits excellent stability in a liquid containing the same, having an advantage that a quantum dot with a narrow particle size distribution is easily obtained. An InP quantum dot precursor such as the magic size cluster is highly convenient as a raw material for a quantum dot because the quantum dot can be obtained only through a simple treatment such as heating of the same.

CITATION LIST

Patent Literature

Patent Literature 1
Japanese Patent Laid-Open No. 2011-26472
Patent Literature 2
Japanese Patent Laid-Open No. 2015-209524
Patent Literature 3
Japanese Patent Laid-Open No. 2016-517454

Non Patent Literature

Non Patent Literature 1
Two-Step Nucleation and Growth of InP Quantum Dots via Magic-Sized Cluster Intermediates, Chemistry of Materials (2015), 27(4), 1432-1441
Non Patent Literature 2
Templated Growth of InP Nanocrystals with a Polytwistane Structure, Angewandte Chemie, International Edition (2018), 57(7), 1908-1912
Non Patent Literature 3
Magic size InP and InAs clusters: synthesis, characterization and shell growth, Chemical Communications (Cambridge, United Kingdom) (2017), 53(17), 2626-2629

SUMMARY OF INVENTION

Technical Problem

However, in the case of producing an InP-based quantum dot through an InP quantum dot precursor such as a magic size cluster including In and P produced from a conventional tertiary silylphosphine compound, there exists a problem that the particle size distribution of the resulting InP-based quantum dot grows wider, so that the full width at half maximum (hereinafter also referred to as FWHM) of the emission peak increases.

Solution to Problem

As a result of extensive study for solving the above problem, the present inventors have found that through reduction of the amount of specific impurity components in a silylphosphine compound used for producing the InP quantum dot precursor, the particle size distribution of the resulting InP-based quantum dot is narrowed, so that InP-based quantum dot having a small full width at half maximum of the emission peak can be obtained. The present invention has been thus completed.

In other words, the present invention provides a method for producing an InP quantum dot precursor from a phosphorus source and an indium source, wherein a silylphosphine compound represented by the following Formula (1) with a content of a compound represented by the following Formula (2) of 0.3 mol % or less:

wherein R is each independently an alkyl group having 1 or more and 5 or less carbon atoms or an aryl group having 6 or more and 10 or less carbon atoms.

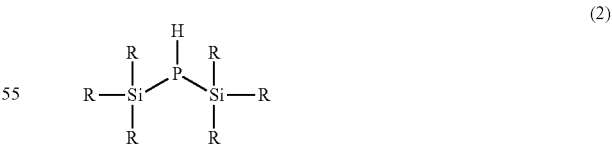

wherein R is the same as in formula (1) is used as the phosphorus source.

Further, the present invention provides a method for producing an InP-based quantum dot by heating an InP quantum dot precursor obtained by the production method described above together with a compound containing another element source on an as needed basis at a temperature of 200° C. or more and 350° C. or less to obtain a quantum dot.

Advantageous Effects of Invention

According to the present invention, a method for producing an InP quantum dot precursor from which an InP-based quantum dot excellent in particle formation can be obtained, and a method for producing an InP-based quantum dot can be provided, so that a high-quality InP-based quantum dot having a narrow width of particle size distribution can be obtained.

BRIEF DESCRIPTION OF DRAWINGS

FIG. 1 (a) is an IR spectrum of indium acetate used as a raw material in Production Example 2, and FIG. 1 (b) is an IR spectrum of indium acetate that is a product of a first step in Production Example 2.

FIG. 2 is an IR spectrum of indium myristate that is a product of a second step in Production Example 2.

FIG. 3 is an IR spectrum of indium myristate that is a product in Production Example 3.

FIG. 4 is a UV-VIS spectrum of a liquid containing the InP quantum dot precursor obtained in Example 1.

FIG. 5 is a UV-VIS spectrum of a liquid containing the InP quantum dot obtained in Example 1.

FIG. 6 is a UV-VIS spectrum of a liquid containing the InP quantum dot precursor obtained in Example 3.

FIG. 7 is a UV-VIS spectrum of a liquid containing the InP quantum dot obtained in Example 3.

DESCRIPTION OF EMBODIMENT

Hereinafter, preferred embodiments of the method for producing an indium phosphide (InP) quantum dot precursor of the present invention are described.

(InP Quantum Dot Precursor)

An InP quantum dot precursor is a cluster including subdivisions of an InP quantum dot as a nanoparticle having a particle size of several nm to several tens of nm and has a specific number for excellent stability in a solvent of constituent atoms, for example, several to several hundreds of atoms. The InP quantum dot precursor may be a magic size cluster composed of several tens to several hundreds of atoms, or may have a smaller number of atoms than that. Since the InP quantum dot precursor can have excellent stability in a solvent as described above, there is an advantage that an InP-based quantum dot having a narrow particle size distribution is easily obtained using the InP quantum dot precursor. In the present specification, InP in the InP quantum dot precursor means including In and P, though the molar ratio between In and P may not be 1:1. An InP quantum dot precursor usually includes In and P, and a ligand derived from a phosphorus source or an indium source as a raw material may be bonded to an In or P atom located in the outermost shell thereof. Examples of the ligand include an organic carboxylic acid residue in the case where the indium source is an indium salt of the organic carboxylic acid, and an alkylphosphine used as an additive.

The formation of an InP quantum dot precursor in the reaction solution can be confirmed, for example, through measurement of the ultraviolet-visible light absorption spectrum (UV-VIS spectrum). In the case where an InP quantum dot precursor is formed in a reaction solution obtained by reacting an In source and a P source, a peak or a shoulder is observed in the range of 300 nm or more and 460 nm or less in a UV-VIS spectrum. A shoulder clearly has an inflection point, though not having a sharp tip shape as clearly as a peak. In the case where a shoulder is observed, it is preferable to have one or two or more inflection points in the range of 300 nm or more and 460 nm or less, particularly 310 nm or more and 420 nm or less. It is preferable that the UV-VIS spectrum be measured at 0° C. or more and 40° C. or less. A sample solution is prepared by diluting the reaction solution with a solvent such as hexane. Each of the amounts of In and P in the sample solution in measurement is preferably in the range of 0.01 mmol or more and 1 mmol or less, more preferably 0.02 mmol or more and 0.3 mmol or less in terms of phosphorus atoms and indium atoms, respectively, relative to 100 g of the sample solution. Examples of the solvent of the reaction solution include solvents that can be suitably used for the reaction of the indium source and the phosphorus source, which will be described later. As described later, the InP quantum dot precursor in the solvent heated to 200° C. or more and 350° C. or less grows into an InP quantum dot, and a peak is observed in the UV-VIS spectrum of the reaction solution usually in the range of 450 nm or more and 550 nm or less. In contrast, in the reaction solution before heating, no peak is observed in the range of 450 nm or more and 550 nm or less.

Further, it can be confirmed that an InP quantum dot precursor is produced in the reaction solution by, for example, color change of the reaction solution into yellowish green to yellow, instead of by the UV-VIS spectrum. The color may be visually confirmed. For example, a reaction solution containing an InP magic size cluster is usually yellow, and a reaction solution containing a precursor composed of In and P and having a smaller number of atoms than the magic size cluster is usually yellowish green.

The stability of the InP quantum dot precursor in a solvent is thermodynamic, and the InP quantum dot precursor has a property reactive to heating. For example, an InP quantum dot precursor in the preferred solvent described above can grow into an InP quantum dot by heating to preferably 200° C. or more and 350° C. or less, more preferably 240° C. or more and 330° C. or less. This can be confirmed by observation of a peak shift toward the long wavelength side in measurement of UV-VIS spectrum of the reaction solution after heating. For example, in the case where an InP quantum dot precursor in a solvent is heated to preferably 200° C. or more and 350° C. or less, more preferably 240° C. or more and 330° C. or less, without addition of elements other than In and P constituting the quantum dot, a peak is observed in the range of 450 nm or more and 550 nm or less in the UV-VIS spectrum. InP in the InP quantum dot means including In and P, though the molar ratio between In and P may not be 1:1. In the UV-VIS spectrum in the range of 300 nm or more and 800 nm or less of a liquid containing an InP quantum dot obtained by heating an InP quantum dot precursor to preferably 200° C. or more and 350° C. or less, more preferably 240° C. or more and 330° C. or less, it is preferable that an absorption peak having a highest peak height be observed in the range of 450 nm or more and 550 nm or less.

Incidentally, in the UV-VIS spectrum of a liquid containing an InP quantum dot obtained by heating an InP quantum dot precursor to preferably 200° C. or more and 350° C. or less, more preferably 240° C. or more and 330° C. or less, without addition of elements other than In and P constituting the quantum dot, no peak is usually observed in the range of 300 nm or more and 460 nm or less.

It can also be confirmed that an InP quantum dot is produced in a reaction solution by, for example, color change of the reaction solution into orange to red. The color may be visually confirmed.

The UV-VIS spectrum of the reaction solution and the color of the reaction solution after heating of an InP quantum dot precursor described above typically refer to the cases where heating is performed without addition of elements other than In P constituting the quantum dot. However, as described later, the present invention does not exclude the case where heating is performed with addition of such a compound to an InP quantum dot precursor.

In the present specification, a quantum dot containing no other constituent elements other than In and P, a quantum dot containing other constituent elements other than In and P, and a quantum dot having a core-shell structure including such a quantum dot as core material, which is coated with a coating compound are collectively referred to as "InP-based quantum dot".

(Phosphorus Source)

In the production method of the present invention, an InP quantum dot precursor is obtained through a reaction of an indium source and a phosphorus source, and a silylphosphine compound represented by the following formula (1) is used as the phosphorus source. The silylphosphine compound used as phosphorus source is a tertiary compound having a phosphorus atom to which three silyl groups are bonded.

[Chemical formula 3]

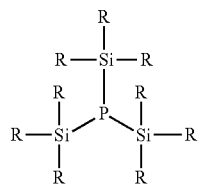
(1)

wherein R each independently are an alkyl group having 1 or more and 5 or less carbon atoms or an aryl group having 6 or more and 10 or less carbon atoms.

Preferred examples of the alkyl group represented by R having 1 or more and 5 or less carbon atoms include a straight-chain or branched-chain alkyl group, and specifically, a methyl group, an ethyl group, an n-propyl group, and an iso-propyl group, an n-butyl group, a sec-butyl group, a tert-butyl group, an iso-butyl group, an n-amyl group, an iso-amyl group, and a tert-amyl group.

Examples of the aryl group represented by R having 6 or more and 10 or less carbon atoms include a phenyl group, a tolyl group, an ethylphenyl group, a propylphenyl group, an iso-propylphenyl group, a butylphenyl group, a sec-butylphenyl group, and a tert-butylphenyl group, an iso-butylphenyl group, a methylethylphenyl group and a trimethylphenyl group.

These alkyl groups and aryl groups may have one or two or more substituents. Examples of the substituent of alkyl groups include a hydroxy group, a halogen atom, a cyano group, and an amino group, and examples of the substituent of aryl groups include an alkyl group having 1 or more and 5 or less carbon atoms, an alkoxy group having 1 or more and 5 or less carbon atoms, a hydroxy group, a halogen atom, a cyano group, and an amino group. In the case where an aryl group is substituted with an alkyl group or an alkoxy group, the number of carbon atoms in the aryl group includes the number of carbon atoms of the alkyl group or the alkoxy group.

The plurality of R in Formula (1) may be the same or different (the same applies to Formula (I) and each of Formulas (2) to (7) described later). Further, the three silyl groups (—SiR$_3$) present in Formula (1) may be the same or different. As the silylphosphine compound represented by Formula (1), one with R being an alkyl group having 1 or more and 4 or less carbon atoms or a phenyl group unsubstituted or substituted with an alkyl group having 1 or more and 4 or less carbon atoms is preferred, from the viewpoint of a phosphorus source having excellent reactivity with other molecules such as an indium source during a synthesis reaction; and a trimethylsilyl group is particularly preferred.

The silylphosphine compound of Formula (1) with only a small content of the compound of Formula (2) is used as a phosphorus source. As a result of extensive study on a method for narrowing the particle size distribution of an InP quantum dot obtained from an InP quantum dot precursor obtained from the silylphosphine compound of Formula (1) as a raw material by the present inventors, a problem has been found that particle formation does not proceed successfully due to the influence of impurities such as bis(trimethylsilyl)phosphine produced in the production process of a silylphosphine compound. It has been then found that the full width at half maximum of the resulting InP quantum dot can be narrowed by reducing the content of the impurities. In the silylphosphine compound of Formula (1) for use in the present invention, the content of the compound represented by the following Formula (2) is 0.3 mol % or less, more preferably 0.25 mol % or less, and particularly preferably 0.2 mol % or less.

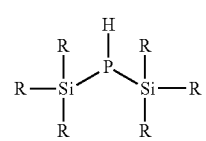
(2)

wherein R is the same as in Formula (1).

Further, it is preferable that the silylphosphine compound of Formula (1) for use as phosphorus source have only a small content of other impurities also, from the viewpoints of effectively reducing the adverse effect of impurities on formation of an InP quantum dot precursor and further narrowing the half-value full width of the InP-based quantum dot.

For example, the silylphosphine compound of Formula (1) has a content of a compound represented by the following Formula (3) of preferably 0.1 mol % or less, more preferably 0.08 mol % or less, and particularly preferably 0.05 mol % or less.

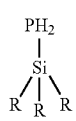
(3)

wherein R is the same as in Formula (1).

The silylphosphine compound of Formula (1) has a content of a silyl ether compound represented by the following Formula (4) of preferably 0.50 mol % or less, more preferably 0.30 mol % or less, and still more preferably 0.15 mol % or less, from the viewpoints of effectively reducing the adverse effect of impurities on formation of an InP quantum dot precursor and further narrowing the half-value full width of the InP-based quantum dot.

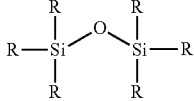
(4)

wherein R is the same as in Formula (1).

The silylphosphine compound of Formula (1) has a content of a compound represented by the following Formula (5) of preferably 0.50 mol % or less, more preferably 0.30 mol % or less, still more preferably 0.15 mol % or less, and particularly preferably 0.05 mol % or less, from the viewpoints of effectively reducing the adverse effect of impurities on formation of an InP quantum dot precursor and further narrowing the half-value full width of the InP-based quantum dot.

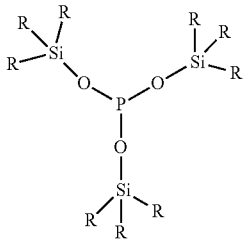
(5)

wherein R is the same as in Formula (1).

The silylphosphine compound of Formula (1) has a content of a silyl ether compound represented by Formula (6) of preferably 0.30 mol % or less, more preferably 0.15 mol % or less, and particularly preferably 0.05 mol % or less, from the viewpoints of effectively reducing the adverse effect of impurities on formation of an InP quantum dot precursor and further narrowing the half-value full width of the InP-based quantum dot.

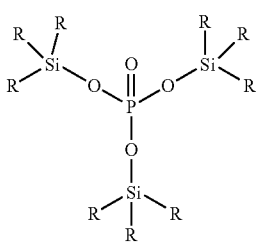
(6)

wherein R is the same as in Formula (1).

The silylphosphine compound of Formula (1) has a content of a silyl ether compound represented by Formula (7) of preferably 1.0 mol % or less, more preferably 0.5 mol % or less, and particularly preferably 0.2 mol % or less, from the viewpoints of effectively reducing the adverse effect of impurities on formation of an InP quantum dot precursor and further narrowing the half-value full width of the InP-based quantum dot.

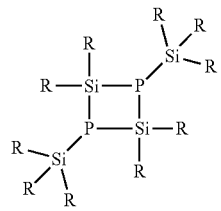
(7)

wherein R is the same as in Formula (1).

In the case where a silylphosphine compound having a content of any one or a plurality or all of the compounds represented by Formulas (3) to (7) in addition to the compound represented by Formula (2) equal to or less than the above upper limit is used in synthesis of an InP quantum dot precursor, in particular, cluster formation is further improved and the particle distribution of the resulting quantum dot is narrowed. The preferable content of the compounds represented by Formulas (2) to (7) described above is the ratio to the compound represented by Formula (1).

In order to have a content of the compound represented by Formula (2) equal to or less than the above upper limit, a production method suitable for the compound represented by Formula (1) described later is adopted, and the amount ratio between a silylating agent and phosphine may be adjusted in the production method. The content of the compound represented by Formula (2) may be measured by, for example, a method in Example described later through $^{31}$P-NMR analysis.

In order to have a content of the compound represented by Formula (3) equal to or less than the above upper limit, a production method suitable for the compound represented by Formula (1) described later is adopted, and the amount ratio between a silylating agent and phosphine may be adjusted in the production method. The content of the compound represented by Formula (3) may be measured by, for example, a method in Example described later through $^{31}$P-NMR analysis.

In order to have a content of the compound represented by Formula (4) equal to or less than the above upper limit, a production method suitable for the compound represented by Formula (1) described later may be adopted. The content of the compound represented by Formula (4) may be measured by, for example, a method in Example described later through gas chromatography analysis.

In order to have a content of the compound represented by Formula (5) equal to or less than the above upper limit, a production method suitable for the compound represented by Formula (1) described later is adopted, and a first step to a third step in the production method may be performed under inert gas atmosphere. The content of the compound represented by Formula (5) may be measured by, for example, a method in Example described later through $^{31}$P-NMR analysis.

In order to have a content of the compound represented by Formula (6) equal to or less than the above upper limit, a production method suitable for the compound represented by Formula (1) described later is adopted, and a first step to a third step in the production method may be performed under inert gas atmosphere. The content of the compound represented by Formula (6) may be measured by, for example, a method in Example described later through $^{31}$P-NMR analysis.

In order to have a content of the compound represented by Formula (7) equal to or less than the above upper limit, a production method suitable for the compound represented by Formula (1) described later is adopted, and high boiling point components may be separated on that occasion. The content of the compound represented by Formula (7) may be measured by, for example, a method in Example described later through $^{31}$P-NMR analysis.

The amount of the compounds represented by Formulas (2) to (7) applies to both the case where a silylphosphine compound is present as a solid such as powder and the case where a silylphosphine compound is dispersed in a solvent. In other words, in the former case, the preferable molar ratio of the compounds represented by Formulas (2) to (7) described above means a molar ratio of the compounds represented by Formulas (2) to (7) to the compound of Formula (1), in a solid such as a powder composed of the silylphosphine compound. In the latter case, the preferable molar ratio described above means a molar ratio of the compounds represented by Formulas (2) to (7) to the compound of Formula (1), in the dispersion liquid in which the silylphosphine compound is dispersed.

The purity of the compound represented by Formula (1) for use in the present invention is preferably 99.0 mol % or more, more preferably 99.3 mol % or more, and particularly preferably 99.5 mol % or more. The purity of the compound represented by Formula (1) may be measured by, for example, a method in Example described later through $^{31}$P-NMR analysis.

(Preferred Method for Producing Compound of Formula (1))

As a method for obtaining a silylphosphine compound of Formula (1) with only a small content of the compounds represented by Formulas (2) to (7) as described above, the following suitable production method may be employed. The present production method is described in detail below.

A method for producing a silylphosphine compound comprises a first step of mixing a solvent having a specific dielectric constant of 4 or less, a basic compound, a silylating agent, and phosphine to obtain a solution containing a silylphosphine compound, a second step of removing the solvent from the solution containing the silylphosphine compound to obtain a concentrated solution of the silylphosphine compound, and a third step of distilling the concentrated solution of the silylphosphine compound to obtain the silylphosphine compound.

Preferred examples of the silylating agent include a compound represented by Formula (I).

[Chemical formula 10]

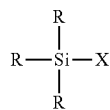

(1)

wherein R is the same as in Formula (1), and X is at least one selected from a fluorosulfonic acid group, a fluoroalkane sulfonic acid group, an alkane sulfonic acid group and a perchloric acid group.

An example of reactions for producing the compound of Formula (1) in the case where the silylating agent is a compound represented by Formula (I) is shown as the following reaction formula. The ratio of the silylating agent to phosphine to be introduced into the mixed solution is preferably more than 3 times by mol, more preferably 3.01 times by mol or more, and particularly preferably 3.05 times by mol or more. The ratio of the silylating agent in the mixed solution to phosphine to be introduced into the mixed solution is preferably 6 times by mol or less, more preferably 4 times by mol or less, and most preferably 3.5 times by mol or less, from the viewpoint of reducing the residual amount of the silylating agent to increase the purity and from the viewpoint of reducing the production cost.

[Chemical Formula 11]

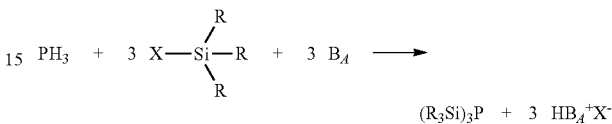

wherein R and X are the same as in Formula (I), and $B_A$ is a monovalent base.

It is preferable that a solvent having a relative permittivity of 4 or less be used, because hydrolysis of the silylphosphine compound of Formula (1) is suppressed, so that formation of impurities represented by Formulas (2) to (4) can be suppressed.

The relative permittivity is the ratio of the permittivity of a substance to the permittivity of vacuum. Generally, the relative permittivity increases as the polarity of a solvent increases. As the relative permittivity of a solvent in the present embodiment, the value described in "Handbook of Chemistry: Pure Chemistry, Revised 5th Edition" (Edited by Chemical Society of Japan, published on Feb. 20, 2004, pp. II-620 to II-622) may be used.

The solvent having a relative permittivity of 4 or less is an organic solvent, preferably a hydrocarbon, particularly preferably a chlorine atom-free hydrocarbon, and particularly preferably a halogen atom-free hydrocarbon. Specific examples of the solvent include an acyclic or cyclic aliphatic hydrocarbon compound and an aromatic hydrocarbon compound. Preferred examples of the acyclic aliphatic hydrocarbon compound include those having 5 or more and 10 or less carbon atoms. For example, pentane (relative permittivity: 1.8371), n-hexane (relative permittivity: 1.8865), n-heptane (relative permittivity: 1.9209), n-octane (relative permittivity: 1.948), n-nonane (relative permittivity: 1.9722), and n-decane (relative permittivity: 1.9853) are particularly preferred. Preferred examples of the cyclic aliphatic hydrocarbon compound include those having 5 or more and 8 or less carbon atoms. For example, cyclohexane (relative permittivity: 2.0243) and cyclopentane (relative permittivity: 1.9687) are particularly preferred. Preferred examples of the aromatic hydrocarbon compound include those having 6 or more and 10 or less carbon atoms, and benzene (relative permittivity: 2.2825), toluene (relative permittivity: 2.379) and p-xylene (relative permittivity: 2.2735) are particularly preferred.

The basic compounds include not only bases in a narrow sense to give hydroxide ions when dissolved in water, but also bases in a broad sense such as substances to receive protons and substances to give electron pairs. It is particularly preferable that the basic compound be an amine, from the viewpoint of being capable of suppressing a side reaction with phosphine.

Examples of the method for removing the solvent in the second step include heating the solution containing the silylphosphine compound represented by Formula (1) in a reduced pressure to evaporate the solvent, under conditions that most of the target silylphosphine compound remains. The treatment may be performed in any distiller for removing a solvent, such as a rotary evaporator. In the second step, the maximum liquid temperature at the time of heating the solution containing the silylphosphine compound represented by Formula (1) in a reduced pressure is preferably 20° C. or more and 140° C. or less, more preferably 25° C. or more and 90° C. or less, from the viewpoint of efficiently removing the solvent and from the viewpoint of preventing decomposition and degeneration of the silylphosphine compound. From the same viewpoints, the pressure at the time of reducing pressure (minimum pressure) is preferably 2 kPa or more and 20 kPa or less, more preferably 5 kPa or more and 10 kPa or less, on the basis of absolute pressure. It is preferable that concentration be performed in an inert atmosphere.

Subsequently, the third step of distilling the concentrate obtained in the second step is performed. The distillation condition is a condition for vaporizing the silylphosphine compound represented by Formula (1), and it is preferable that the distillation temperature (column top temperature) be 50° C. or more from the viewpoint of excellent separability of the target compound. The distillation temperature is preferably 150° C. or less from the viewpoints of suppressing decomposition of the target compound and maintaining the quality. From these viewpoints, the distillation temperature is preferably 50° C. or more and 150° C. or less, more preferably 70° C. or more and 120° C. or less.

It is preferable that the pressure at the time of distillation be 0.01 kPa or more based on the absolute pressure from the viewpoint of efficiently recovering the target compound having high purity. Further, it is preferable that the pressure at the time of distillation be 5 kPa or less based on the absolute pressure, from the viewpoints of suppressing the decomposition and degeneration of the silylphosphine compound represented by Formula (1) and easily obtaining the silylphosphine compound with a high purity at high yield. From these viewpoints, the pressure at the time of distillation is preferably 0.01 kPa or more and 5 kPa or less, and more preferably 0.1 kPa or more and 4 kPa or less. It is preferable that distillation be performed in an inert atmosphere.

Since the initial fraction contains a solvent, a basic compound, a silylating agent, or a trace amount of decomposition products of each component, the purity can be improved by removing the same.

By the above steps, the target silylphosphine compound represented by Formula (1) can be obtained. The resulting silylphosphine compound is stored in a liquid or solid state in an environment in which contact with oxygen, moisture, etc. is excluded to the utmost degree, or stored as a dispersion state in an appropriate solvent. The dispersion also includes a solution.

It is preferable that the solvent for dispersing the silylphosphine compound represented by Formula (1) be an organic solvent, particularly a non-polar solvent, from the viewpoint of preventing decomposition of the silylphosphine compound through prevention of water from entering. Examples of the non-polar solvent include a saturated aliphatic hydrocarbon, an unsaturated aliphatic hydrocarbon, an aromatic hydrocarbon compound, and a trialkylphosphine. Examples of the saturated aliphatic hydrocarbon include n-hexane, n-heptane, n-octane, n-nonane, n-decane, n-dodecane, n-hexadecane, and n-octadecane. Examples of the unsaturated aliphatic hydrocarbon include 1-undecene, 1-dodecene, 1-hexadecene, and 1-octadecene. Examples of the aromatic hydrocarbon include benzene, toluene, xylene, and styrene. Examples of the trialkylphosphine include triethylphosphine, tributylphosphine, tridecylphosphine, trihexylphosphine, trioctylphosphine, tridodecylphosphine, and tridodecylphosphine. It is preferable that the organic solvent for dispersing a silylphosphine compound represented by Formula (1) have a high boiling point, because the silylphosphine compound having pyrophoricity can be stably stored and transported. The boiling point of the organic solvent is preferably 50° C. or more, more preferably 60° C. or more. The upper limit of the boiling point of the organic solvent is preferably 270° C. or less (absolute pressure: 0.1 kPa) from the viewpoint of the influence on physical properties of organic synthetic products and quantum dots produced from the same as a raw material.

It is preferable that the solvent be sufficiently dehydrated before dispersing the silylphosphine compound represented by Formula (1) so as to prevent decomposition of the silylphosphine compound resulting from a reaction with water and formation of impurities therefrom. The amount of water in the solvent is preferably 20 ppm or less, more preferably 10 ppm or less on a mass basis. The water content may be measured by the method described in Example described later. In order to obtain such conditions, for example, the solvent is degassed and dehydrated while heating under reduced pressure or vacuum conditions, and then mixed with the silylphosphine compound represented by Formula (1) in nitrogen gas atmosphere. The mixture is then poured into an airtight container. By these treatments, a dispersion of the silylphosphine compound represented by Formula (1) with impurities sufficiently reduced may be easily obtained. The proportion of the silylphosphine compound in the dispersion of the silylphosphine compound represented by Formula (1) is preferably 3 mass % or more and 50 mass % or less, and more preferably 8 mass % or more and 30 mass % or less.

According to the above production method, a high-purity tertiary silylphosphine compound having a reduced amount of various impurities can be obtained through a specific step with use of a specific solvent.

Incidentally, the silylphosphine compound of Formula (1) with an amount of the compound of Formula (2) reduced to the above upper limit or less may be obtained without employing the production method described above.

(Indium Source)

In the method for producing an InP quantum dot precursor of the present invention, a phosphorus source containing the silylphosphine compound represented by Formula (1) described above is reacted with an indium source. As the indium source, various sources may be used in accordance with a chemical synthesis method to be employed. Preferred examples thereof include indium organic carboxylate, from the viewpoint of easily obtaining an InP quantum dot precursor, and from the viewpoints of easy availability and easy control of the particle size distribution of the resulting InP-based quantum dot. For example, an indium saturated aliphatic carboxylate such as indium acetate, indium formate, indium propionate, indium butyrate, indium valerate, indium caprylate, indium enanthate, indium caprylate, indium pelargonate, indium caprate, indium laurate, indium myristate, indium palmitate, indium margarate, indium stearate, indium oleate, indium 2-ethylhexanate; and an indium unsaturated carboxylate such as indium oleate and indium linoleate may be preferably used. In particular, from the viewpoints of availability and particle size distribution control, it is preferable to use at least one selected from the group consisting of indium acetate, indium laurate, indium myristate, indium palmitate, indium stearate, and indium oleate. In particular, an indium salt of a higher carboxylic acid having 12 or more and 18 or less carbon atoms is preferred.

In the case where indium carboxylate is used as indium source in the present invention, it is preferable that the indium carboxylate contain no hydroxyl group, from the viewpoint of obtaining a high-quality InP quantum dot precursor through synergistic effect with use of the phosphorus source having only a small amount of specific impurities as described above. The indium source containing no hydroxyl group refers to a source containing substantially no indium carboxylate containing a hydroxyl group. Specifically, it is confirmed that indium carboxylate contains no hydroxyl group through measurement of IR spectrum. It is preferable that no absorption peak derived from a hydroxyl group be observed in the vicinity of 1600 cm$^{-1}$ in the IR spectrum of indium carboxylate. Specifically, in the vicinity of 1600 cm$^{-1}$ refers to preferably 1500 cm$^{-1}$ or more and 1700 cm$^{-1}$ or less, and more preferably 1550 cm$^{-1}$ or more and 1650 cm$^{-1}$ or less.

(Method Suitable for Producing Indium Carboxylate)

As an example of a method for producing indium carboxylate having no hydroxyl group, a method suitable for producing an indium salt of higher carboxylic acids is described in detail below.

The present production method roughly includes the following two steps.

First Step:

A step of reacting an indium carboxylate containing a hydroxyl group represented by the following Formula (A):

$$\text{In}(R_1COO)_{3-x}(OH)_x \quad (A)$$

wherein $R_1$ is a hydrogen atom or a straight chain or branched chain aliphatic group having 1 or more and 5 or less carbon atoms, and x is a number greater than 0 and less than 3, with a lower carboxylic acid represented by the following Formula (B):

$$R'COOH \quad (B)$$

wherein R' is a hydrogen atom or a straight chain or branched chain aliphatic group having 1 or more and 5 or less carbon atoms, and at least one of the hydrogen atoms in the aliphatic group may be replaced with a halogen atom, so as to obtain a product.

Step 2

A step of reacting the product obtained in the first step with a higher carboxylic acid having 12 or more carbon atoms.

Each of the steps is described in detail below.

In the hydroxyl group-containing indium carboxylate represented by In($R_1$COO)$_{3-x}$(OH)$_x$ for use in the first step, $R_1$ represents a hydrogen atom, a straight chain or branched chain aliphatic group having 1 or more and 5 or less carbon atoms. As the straight chain or branched chain aliphatic group having 1 or more and 5 or less carbon atoms, a saturated or unsaturated aliphatic group may be used. For example, as $R_1$, a hydrogen atom or a straight chain or branched chain saturated aliphatic group having 1 or more and 5 or less carbon atoms may be used. Specifically, a group derived from formic acid, acetic acid, propionic acid, iso-butyric acid, butyric acid, iso-valeric acid, valeric acid or caproic acid may be used.

The hydroxyl group-containing indium carboxylate represented by Formula (A) is produced by degradation of indium carboxylate represented by In($R_1$COO)$_3$, wherein the definition of $R_1$ is the same as described above. Degradation of In($R_1$COO)$_3$ occurs also when the compound is left in a normal air atmosphere at room temperature, and occurs even under environment suitable for storage such as a cool and dark room over time. The degree of deterioration may be evaluated by the degree of substitution of $R_1$COO groups with OH groups in In($R_1$COO)$_3$. In other words, the degree of degradation of In($R_1$COO)$_3$ may be evaluated based on the value of x in Formula (A). The value of x takes any of more than 0 and less than 3, and the larger the value of x, the more the degradation of In($R_1$COO)$_3$ progresses. The degree of degradation may be also confirmed through measurement of an IR spectrum of indium carboxylate to observe whether the absorption peak derived from a hydroxyl group is present in the range of 1500 cm$^{-1}$ or more and 1700 cm$^{-1}$ or less.

In the first step, a hydroxyl group-containing indium carboxylate represented by In($R_1$COO)$_{3-x}$(OH)$_x$ is reacted with a lower carboxylic acid represented by R'COOH. In the present invention, the "lower carboxylic acid" means a saturated or unsaturated carboxylic acid having 5 or less carbon atoms. The "lower carboxylic acid" is a monovalent carboxylic acid represented by R'COOH, and various derivatives such as salts and esters of R'COOH are not included in the lower carboxylic acid. R' is a hydrogen atom or a straight chain or branched chain aliphatic group having 1 or more and 5 or less carbon atoms. In the case where R' is a straight chain or branched chain aliphatic group having 1 or more and 5 or less carbon atoms, a saturated or unsaturated aliphatic group may be used as the aliphatic group. For example, as R', a hydrogen atom or a straight chain or branched chain saturated aliphatic group having 1 or more and 5 or less carbon atoms may be used. Specifically, a group derived from formic acid, acetic acid, propionic acid, iso-butyric acid, butyric acid, iso-valeric acid, valeric acid or caproic acid may be used.

In the case where R' is an aliphatic group, at least one of the hydrogen atoms in the aliphatic group may be replaced with a halogen atom. As the halogen atom, fluorine, chlorine, bromine or iodine may be used. In R', only one type of halogen atom may be present, or two or more types of halogen atoms may be present. Since a halogen atom has electron withdrawing properties, the acidity of a lower carboxylic acid represented by Formula (B) is enhanced by substitution of the hydrogen atom in R' with a halogen atom. As a result, the reaction between the lower carboxylic acid represented by Formula (B) and the hydroxyl group-containing indium carboxylate represented by Formula (A) is facilitated. From the viewpoint of further enhancing the advantage, it is preferable that at least one of the hydrogen atoms in the aliphatic group in R' be replaced with fluorine, and it is more preferable that all the hydrogen atoms in the aliphatic group be replaced with fluorine.

Alternatively, a small amount of such a lower carboxylic acid having enhanced acidity may be catalytically added for facilitating the reaction. In the case where a lower carboxylic acid substituted with a halogen atom is catalytically added, the amount added is preferably 0.01 mol or more and 10 mol or less, more preferably 0.05 mol or more and 5 mol or less, and still more preferably 0.1 mol or more and 1 mol or less, relative to 1 mol of the hydroxyl group in a hydroxyl group-containing indium carboxylate.

In the first step, it is preferable to use a lower carboxylic acid having the same $R_1$COO group as that of a hydroxyl group-containing indium carboxylate represented by In($R_1$COO)$_{3-x}$(OH)$_x$. For example, being a lower carboxylic acid having the same $R_1$COO as that of In($R_1$COO)$_{3-x}$(OH)$_x$ means that CH$_3$COOH is used as the lower carboxylic acid in the case where a hydroxyl group-containing indium carboxylate is represented by $In(CH_3COO)_{3-x}(OH)_x$. The reaction between the hydroxyl group-containing indium carboxylate represented by Formula (A) and the lower carboxylic acid having the same $R_1COO$ has advantages that quality can be easily checked in the first step, and progress of a substitution reaction between the lower carboxylic acid and a higher carboxylic acid in the second step described below can be easily confirmed.

In the first step, it is also preferable to use a lower carboxylic acid having the same $R_1COO$ group as that of the hydroxyl group-containing indium carboxylate represented by $In(R_1COO)_{3-x}(OH)_x$ (however, at least one of the hydrogen atoms in $R_1$ is replaced with a halogen atom). As the halogen atom, fluorine, chlorine, bromine or iodine may be used. In $R_1$, only one type of halogen atom may be present, or two or more types of halogen atoms may be present. The advantage of the substitution of the hydrogen atom in $R_1$ with a halogen atom is as described above. From the viewpoint of facilitating the reaction between the lower carboxylic acid represented by Formula (B) and the hydroxyl group-containing indium carboxylate represented by Formula (A), it is preferable that at least one of the hydrogen atoms in $R_1$ be replaced with fluorine, and it is preferable that all the hydrogen atoms in $R_1$ be replaced with fluorine.

It is preferable that the reaction between a hydroxyl group-containing indium carboxylate and a lower carboxylic acid be performed under conditions that the lower carboxylic acid is present in an amount equal to or more than the amount of the hydroxyl group-containing indium carboxylate. Through the reaction under such conditions, the substitution reaction between the hydroxyl group in the hydroxyl group-containing indium carboxylate and the R'COO group in the lower carboxylic acid easily proceeds, so that $In(R_1COO)_{3-x}(R'COO)_x$ as indium carboxylate is successfully produced. From the viewpoint of further enhancing the advantage, the amount of the lower carboxylic acid relative to 1 mol of the hydroxyl group in the hydroxyl group-containing indium carboxylate is preferably 1 mol or more and 3000 mol or less, more preferably 1 mol or more and 1000 mol or less, and still more preferably 1 mol or more and 500 mol or less. The amount of the lower carboxylic acid is the sum of the amount of the lower carboxylic acid actually added and, in the case of using an acid anhydride described later, the amount of the lower carboxylic acid produced by the reaction between the acid anhydride and water.

When a hydroxyl group-containing indium carboxylate is reacted with a lower carboxylic acid, the lower carboxylic acid may be added to the hydroxyl group-containing indium carboxylate all at once or sequentially, or in an opposite manner, the hydroxyl group-containing indium carboxylic acid may be added to the lower carboxylic acid all at once or sequentially. Alternatively, both may be added all at once at the same time or sequentially. Whatever form of addition is employed, the reaction may be performed at room temperature, i.e., unheated conditions, or under heated conditions. In the case where the reaction is performed under heated conditions, the reaction temperature depends on the lower carboxylic acid for use, being controlled to preferably 30° C. or more and 200° C. or less, more preferably 50° C. or more and 150° C. or less, and still more preferably 80° C. or more and 120° C. or less, from the viewpoint of enhancing the reaction efficiency. The reaction time on this occasion is preferably 5 minutes or more and 600 minutes or less, more preferably 15 minutes or more and 300 minutes or less, and 30 minutes or more and 180 minutes or less from the viewpoint of obtaining a sufficient yield. In the case where the reaction is performed under heated conditions, it is preferable that the reaction be performed under refluxing conditions from the viewpoint of obtaining a high yield.

From the viewpoint of successful proceeding of the reaction between the hydroxyl group-containing indium carboxylate and the lower carboxylic acid, the reaction may be performed in an aprotic organic solvent or in a protic organic solvent having low nucleophilicity. Examples of the protic organic solvent include nitromethane. Examples of the aprotic organic solvent include acetone, acetonitrile, dimethylformamide, N-methylpyrrolidone, toluene, xylene, dibutyl ether, cyclopentyl methyl ether, and chlorobenzene.

The reaction between a hydroxyl group-containing indium carboxylate and a lower carboxylic acid in the first step proceeds according to the following formula:

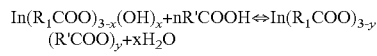

wherein x is the same as described above, y is a number more than 0 and 3 or less, and n is a number equal to x or more.

As shown in the reaction formula, a hydroxyl group-containing indium carboxylate reacts with a lower carboxylic acid to produce water as by-produced. The presence of water can affect the purity of $In(R_1COO)_{3-y}(R'COO)_y$, which is the target product in the first step. It is therefore advantageous to remove water as by-product from the reaction system. From this viewpoint, it is preferable to allow coexistence of a dehydrating agent in the reaction between a hydroxyl group-containing indium carboxylate and a lower carboxylic acid. It is preferable that, an acid anhydride (an anhydride of monovalent carboxylic acid) be particularly used as the dehydrating agent, from the viewpoint of enhancing the purity of $In(R_1COO)_{3-y}(R'COO)_y$ as target product in the first step, because a lower carboxylic acid is produced from the acid anhydride through a reaction with water produced as by-product, and the produced lower carboxylic acid is capable of reacting with the hydroxyl group-containing indium carboxylate. The acid anhydride used as dehydrating agent has a structure represented by $(R"CO)_2O$. R" represents a hydrogen atom or a straight chain or branched chain aliphatic group having 1 or more and 5 or less carbon atoms. R" may be the same as or different from $R_1$ and/or R'. In other words, the anhydride of a carboxylic acid of the same as or different from the lower carboxylic acid may be used as dehydrating agent. From the viewpoint of further enhancing the purity of $In(R_1COO)_{3-y}(R'COO)_y$ as target product in the first step, it is advantageous that R" is the same as R', and it is advantageous that R" is the same as R and R'. In other words, in the case where a hydroxyl group-containing indium carboxylate is represented by $In(R_1COO)_{3-x}(OH)_x$, it is preferable that the lower carboxylic acid have the same $R_1COO$ group as that of the hydroxyl group-containing indium carboxylate, and the acid anhydride have the same $R_1CO$ group as that of the hydroxyl group-containing indium carboxylate.

The amount of acid anhydride for use as dehydrating agent may be an amount capable of removing water produced as by-product of the reaction between a hydroxyl group-containing indium carboxylate and a lower carboxylic acid. Specifically, relative to 1 mol of the hydroxyl group of 1 mol of hydroxyl group-containing indium carboxylate, an acid anhydride in an amount of preferably 0.1 mol or more and 100 mol or less, more preferably 1 mol or more and 50 mol or less, and still more preferably 1 mol or more and 20 mol, is added to the reaction system.

Through the first step, a product containing $In(R_1COO)_{3-y}(R'COO)_y$ is obtained. A second step is then performed to react the product with a higher carboxylic acid. When the product of the first step is reacted with the higher carboxylic acid, the higher carboxylic acid may be added into the product of the first step all at once or sequentially, or in an opposite manner, the product of the first step may be added into the higher carboxylic acid all at once or sequentially. Alternatively, both may be added all at once at the same time or sequentially.

In the second step, it is advantageous to use the higher carboxylic acid as solvent in addition to as a reactant. From this viewpoint, it is preferable to perform the reaction under conditions in which an excess amount of a higher carboxylic acid is present relative to $In(R_1COO)_{3-y}(R'COO)_y$ contained in the product in the first step. Through the reaction under such conditions, an exchange reaction of the $R_1COO$ group and the R'COO group in $In(R_1COO)_{3-y}(R'COO)_y$ with a higher carboxylic acid can proceed smoothly. From the viewpoint of further enhancing the advantage, the amount of the higher carboxylic acid is preferably 3 mol or more and 100 mol or less, more preferably 3 mol or more and 50 mol or less, and still more preferably 4 mol or more and 30 mol or less, relative to 1 mol of $In(R_1COO)_{3-y}(R'COO)_y$.

The reaction may be performed at room temperature, i.e., unheated conditions, or under heated conditions. In the case where the reaction is performed under heated conditions, the reaction temperature is appropriately set depending on the boiling point of the higher carboxylic acid, and generally set to preferably 20° C. or more and 300° C. or less, more preferably 50° C. or more and 250° C. or less, and still more preferably 80° C. or more and 200° C. or less. The reaction time on this occasion is preferably 10 minutes or more and 900 minutes or less, more preferably 30 minutes or more and 600 minutes or less, and 60 minutes or more and 300 minutes or less from the viewpoint of obtaining a sufficient yield.

Further, from the viewpoint of successful proceeding of the reaction in the second step, the reaction may be performed in an aprotic organic solvent or in a protic organic solvent having low nucleophilicity. Examples of the protic organic solvent include nitromethane. Examples of the aprotic organic solvent include acetone, acetonitrile, dimethylformamide, N-methylpyrrolidone, toluene, xylene, dibutyl ether, cyclopentyl methyl ether, and chlorobenzene.

The higher carboxylic acid for use in the second step has 12 or more carbon atoms. As the higher carboxylic acid, a monovalent carboxylic acid or a polyvalent carboxylic acid may be used. In the case where indium carboxylate as target product of the present production method is used as a raw material for an quantum dot, it is advantageous to use a monovalent carboxylic acid as the higher carboxylic acid.

A monovalent higher carboxylic acid is represented by $R_2COOH$. In the formula, $R_2$ represents a straight chain or branched chain aliphatic group having 11 or more carbon atoms, preferably 11 or more and 19 or less carbon atoms. As the aliphatic group, a saturated or unsaturated aliphatic group may be used. In other words, as the higher carboxylic acid, a straight chain saturated or unsaturated carboxylic acid having 12 or more carbon atoms, preferably 12 or more and 20 or less carbon atoms, may be used.

In the case of using indium carboxylate that is the target product of the present production method as a raw material for a quantum dot, it is preferable that a straight chain or branched chain saturated aliphatic group having 11 or more carbon atoms, particularly 11 or more and 19 or less carbon atoms, be used as $R_2$. Specifically, it is preferable to use lauric acid, tridecylic acid, myristic acid, pentadecylic acid, palmitic acid, margaric acid, stearic acid, nonadecylic acid, arachidic acid or oleic acid. One of these higher carboxylic acids may be used alone, or two or more thereof may be used in combination.

The reaction in the second step proceeds according to the following formula.

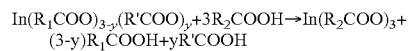

As shown in the formula, the reaction produces $R_1COOH$ and R'COOH, i.e., lower carboxylic acids. Accordingly, through removal of the lower carboxylic acid from the reaction system, the reaction is further facilitated, so that the yield of $In(R_2COO)_3$ is enhanced. Since the lower carboxylic acid is known to be a compound having a low boiling point, a reaction system under reduced pressure is advantageous for removal of the lower carboxylic acid from the reaction system. Such a reaction system enables the lower carboxylic acid to be easily vaporized, so that removal from the reaction system can be easily achieved. From this viewpoint, the pressure of the reaction system in the second step is controlled to preferably 0.1 Pa or more and 10 kPa or less, particularly 0.5 Pa or more and 5 kPa or less, and particularly preferably 1 Pa or more and 1 kPa or less.

After completion of the reaction in the second step, acetone or the like as poor solvent is added to the reaction system to precipitate $In(R_2COO)_3$ as target product, which is an indium salt of a higher carboxylic acid. The precipitate is separated by filtration, subjected to repulp cleaning with an organic solvent, and dried to obtain high-purity indium carboxylate containing no hydroxyl group.

(Reaction Between Phosphorus Source and Indium Source)

In the production method of the present invention, it is preferable that a silylphosphine compound represented by Formula (1) with less impurities of Formula (2) and an indium source be mixed and reacted at a temperature of 20° C. or more and 150° C. or less. Examples of the chemical synthesis method include a sol-gel method (colloid method), a hot soap method, an inverse micelle method, a solvothermal method, a molecular precursor method, a hydrothermal synthesis method, and a flux method.

The molar ratio between the phosphorus source and the indium source to be mixed during the reaction, i.e., P:In, is preferably 1:0.5 or more and 10 or less, more preferably 1:1 or more and 5 or less, from the viewpoint of successfully obtaining an InP quantum dot precursor.

It is preferable that the reaction between the phosphorus source and the indium source be performed in an organic solvent from the viewpoints of reactivity and stability. Examples of the organic solvent include a non-polar solvent from the viewpoint of stability of the phosphorus source and the indium source, and preferred examples thereof include solvents such as an aliphatic hydrocarbon, an unsaturated aliphatic hydrocarbon, an aromatic hydrocarbons, trialkylphosphine, and trialkylphosphine oxide from the viewpoints of reactivity and stability. Examples of the aliphatic hydrocarbon include n-hexane, n-heptane, n-octane, n-nonane, n-decane, n-dodecane, n-hexadecane, and n-octadecane. Examples of the unsaturated aliphatic hydrocarbon include 1-undecene, 1-dodecene, 1-tetradecene, 1-hexadecene, and 1-octadecene. Examples of the aromatic hydrocarbon include benzene, toluene, xylene, and styrene. Examples of the trialkylphosphine include triethylphosphine, tributylphosphine, tridecylphosphine, trihexylphosphine, trioctylphosphine, and tridodecylphosphine. Examples of the trialkylphosphine oxide include triethylphosphine oxide, tributylphosphine oxide, tridecylphosphine oxide, trihexylphosphine oxide, trioctylphosphine oxide, and tridodecylphosphine oxide.

It is preferable that the solvent be dehydrated before use in order to prevent decomposition of the silylphosphine compound through reaction with water and the resulting formation of impurities. The water content in the solvent is preferably 20 ppm or less based on mass. The water content may be measured by the method described in Example described later. It is also preferable to degas the solvent before use to remove oxygen. Degassing may be done by any method such as substitution with an inert atmosphere in the reactor.

The concentrations of the phosphorus source and the indium source in the reaction solution obtained by mixing the phosphorus source and the indium source, as the phosphorus atom based concentration and the indium atom based concentration, respectively, relative to 100 g of the reaction solution are, for example, preferably in the range of 0.1 mmol or more and 10 mmol or less, more preferably in the range of 0.1 mmol or more and 3 mmol or less, from the viewpoints of reactivity and stability.

A preferred method of mixing a phosphorus source and a indium source includes dissolving the phosphorus source and the indium source in organic solvents, respectively, and mixing the solution in which the phosphorus source is dissolved and the solution in which the indium source is dissolved, from the viewpoint of easy generation of an InP quantum dot precursor. The solvent for dissolving the phosphorus source and the solvent for dissolving the indium source may be the same or different.

In this case, the phosphorus atom based concentration of the phosphorus source in the solution in which the phosphorus source is dissolved in an organic solvent is preferably in the range of 20 mmol/L or more and 2000 mmol/L or less, more preferably in the range of 80 mmol/L or more and 750 mmol/L or less, from the viewpoint of reactivity and stability. Also, the indium atom based concentration of the indium source in the solution in which the indium source is dissolved in an organic solvent is preferably in the range of 0.1 mmol/L or more and 20 mmol/L or less, more preferably 0.2 mmol/L or more and 10 mmol/L or less, from the viewpoint of reactivity and stability.

It is preferable to add an additive that can serve as a ligand to the reaction solution containing the phosphorus source and the indium source, from the viewpoint of improving the quality of the resulting InP quantum dot precursor and InP-based quantum dot. The inventors believe that the coordination of an additive that can serve as a ligand to In or the change in polarity of the reaction field affects the quality of an InP quantum dot precursor and an InP-based quantum dot. Examples of the additive include a phosphine derivative, an amine derivative, and a phosphonic acid.

As the phosphine derivative, a primary or higher and tertiary or lower alkyl phosphine is preferred, and preferred examples thereof include one having a straight chain alkyl group having 2 or more and 18 or less carbon atoms in the molecule. The alkyl groups in the molecule may be the same or different. Specific examples of the straight chain alkylphosphine having an alkyl group having 2 or more and 18 or less carbon atoms include monoethylphosphine, monobutylphosphine, monodecylphosphine, monohexylphosphine, monooctylphosphine, and monododecylphosphine, monohexadecylphosphine, diethylphosphine, dibutylphosphine, didecylphosphine, dihexylphosphine, dioctylphosphine, didodecylphosphine, dihexadecylphosphine, triethylphosphine, tributylphosphine, tridecylphosphine, trihexylphosphine, trioctylphosphine, tridodecylphosphine, and trihexadecylphosphine. Among them, from the viewpoint of improving the quality of the resulting InP quantum dot precursor and quantum dot, those having an alkyl group having 4 or more and 12 or less carbon atoms in the molecule are particularly preferred. A trialkylphosphine is preferred, and trioctylphosphine is most preferred.

It is preferable that the amine derivative be a primary or higher and tertiary or lower alkylamine, and preferred examples thereof include one having a straight chain alkyl group having 2 or more and 18 or less carbon atoms in the molecule. The alkyl groups in the molecule may be the same or different. Specific examples of the alkylamine having a straight chain alkyl group having 2 or more and 18 or less carbon atoms include monoethylamine, monobutylamine, monodecylamine, monohexylamine, monooctylamine, monododecylamine, monohexadecylamine, diethylamine, dibutylamine, didecylamine, dihexylamine, dioctylamine, didodecylamine, dihexadecylamine, triethylamine, tributylamine, tridecylamine, trihexylamine, trioctylamine, tridodecylamine, and trihexadecylamine. It is also preferable that the phosphonic acid be a monoalkylphosphonic acid having a straight chain alkyl group having 2 or more and 18 or less carbon atoms in the molecule.

It is preferable that the amount of the additive that can serve as a ligand in the reaction solution containing a phosphorus source and an indium source be 0.2 mol or more relative to 1 mol of In, from the viewpoint of enhancing the effect for improving the quality of the InP quantum dot precursor and the InP quantum dot through addition of the additive that can serve as a ligand. It is preferable that the amount added of the additive that can serve as a ligand be 20 mol or less relative to 1 mol of In from the viewpoint of the effect for improving quality. From these viewpoints, it is more preferable that the amount added of the additive that can serve as a ligand be 0.5 mol or more and 15 mol or less relative to 1 mol of In.

The timing of addition of the additive that can serve as a ligand to the reaction solution may be as follows. The additive that can serve as a ligand is mixed with an indium source to form a mixed solution, and the mixed solution may be mixed with a phosphorus source. Alternatively, the additive that can serve as a ligand is mixed with a phosphorus source to form a mixed solution, and this mixed solution may be mixed with an indium source. Alternatively, the additive that can serve as a ligand may be mixed with a mixed solution of a phosphorus source and an indium source.

The solution in which a phosphorus source is dissolved in an organic solvent and the solution in which an indium source is dissolved in an organic solvent may be preliminarily heated to a preferred reaction temperature described later or to a lower or higher temperature than that before mixing, or may be heated to a preferred reaction temperature described later after mixing. The preliminary heating temperature is preferably within ±10° C. of the reaction temperature and at 20° C. or more, and more preferably within ±5° C. of the reaction temperature and at 30° C. or more, from the viewpoints of reactivity and stability.

From the viewpoints of reactivity and stability, the reaction temperature between a phosphorus source and an indium source is preferably 20° C. or more and 150° C. or less, more preferably 40° C. or more and 120° C. or less. From the viewpoints of reactivity and stability, the reaction time at the reaction temperature is preferably 0.5 minutes or more and 180 minutes or less, more preferably 1 minute or more and 80 minutes or less.

Through the above steps, a reaction solution containing an InP quantum dot precursor is obtained.

(Method for Producing InP-Based Quantum Dot)

A method for producing an InP-based quantum dot using the InP quantum dot precursor obtained as described above is described below. The InP-based quantum dot refers to a semiconductor nanoparticle containing In and P, having a quantum confinement effect. The quantum confinement effect means that electrons in a substance having about the size of Bohr radius cannot move freely, and the electron energy in such a state is not arbitrary but can take only a specific value. The particle size of a quantum dot (semiconductor nanoparticle) is usually in the range of several nm to several tens of nm. However, among those corresponding to the description of quantum dots, those corresponding to quantum dot precursors are not included in the category of quantum dots in the present specification. Based on the knowledge that with use of the InP quantum dot precursor of the present invention for synthesis of an InP-based quantum dot, a high quality InP-based quantum dot having a narrow width of particle size distribution can be obtained, the present inventors have found the present production method.

The reaction solution containing the InP quantum dot precursor of the present invention obtained as described above has a temperature of preferably 20° C. or more and 150° C. or less, more preferably 40° C. or more and 120° C. or less, after completion of the reaction, and may be used at the temperature maintained or cooled to room temperature.

From the viewpoint of particle size control, the reaction solution containing the InP quantum dot precursor is heated at a temperature of preferably 200° C. or more and 350° C. or less, more preferably 240° C. or more and 330° C. or less to obtain an InP-based quantum dot. The rate of temperature rise during heating is preferably 1° C./min or more and 50° C./min or less, more preferably 2° C./min or more and 40° C./min or less from the viewpoints of time efficiency and particle size control. Further, from the viewpoint of particle size control, the heating time at the temperature is preferably 0.5 minutes or more and 180 minutes or less, and more preferably 1 minute or more and 60 minutes or less.

The InP-based quantum dot produced by the production method of the present invention may be a quantum dot composed of a composite compound having an element M other than phosphorus and indium in addition to In and P (also referred to as a composite quantum dot of In, P and M). It is preferable that the element M be at least one selected from the group consisting of Be, Mg, Ca, Mn, Cu, Zn, Cd, B, Al, Ga, N, As, Sb, and Bi from the viewpoint of improving the quantum yield. Typical examples of the InP-based quantum dot containing element M include InGaP, InZnP, InAlP, InGaAlP, InNP, InAsP, InPSb, and InPBi. In order to obtain an InP-based quantum dot containing element M, a compound containing element M may be added to the reaction solution when the liquid containing the InP quantum dot precursor is heated. The compound containing element M is a compound in the form of chloride, bromide or iodide of element M, or in the form of higher carboxylic carboxylate having 12 or more and 18 or less carbon atoms, in the case where element M is Be, Mg, Ca, Mn, Cu, Zn, Cd, B, Al or Ga. In the case where the compound is in the form of higher carboxylate salt, the carboxylic acid may be the same as or different from the carboxylic acid of the indium carboxylate used in the reaction. In the case where element M is N, As, Sb, or Bi, a compound in a form with element M to which three silyl groups or amino groups are bonded may be suitably used.

The InP-based quantum dot produced by the production method of the present invention is a high-quality InP-based quantum dot having a narrow width of particle size distribution, and the surface of the InP-based quantum dot may be treated with a surface treatment agent for the purpose of increasing the quantum yield. The surface treatment of the surface of an InP-based quantum dot protects the defects in the surface of the InP quantum dot, so that the quantum yield can be improved. Examples of the suitable surface treatment agent include a metal-containing compound such as a metal carboxylate, a metal carbamate, a metal thiocarboxylate, a metal halide, a metal acetylacetonate and hydrates thereof, a halogen-containing compound such as a halogenated alkanoyl compound, a halogenated quaternary ammonium compound, a halogenated quaternary phosphonium compound, a halogenated aryl compound and a halogenated tertiary hydrocarbon compound, and an organic acid such as a carboxylic acid, a carbamic acid, a thiocarboxylic acid, a phosphonic acid and a sulfonic acid. Among those, a metal carboxylate or a metal carbamate is preferred from the viewpoint of further improving the quantum yield.

The metal carboxylate may have a straight chain, branched chain or cyclic alkyl group having 1 or more and 24 or less carbon atoms, containing an saturated or unsaturated bond, which may be unsubstituted or substituted with a halogen atom, or may have a plurality of carboxylic acids in the molecule. Examples of the metal of the metal carboxylate include Li, Na, K, Rb, Cs, Be, Mg, Ca, Sr, Ba, Sc, Y, Ti, Zr, V, Nb, Cr, Mo, Mn, Fe, Co, Ni, Cu, Ag, Zn, Cd, Hg, B, Al, Ga, In, Tl, Ge, Sn, Pb, Sb, Bi, La, Ce and Sm. Among these, the metal of the metal carboxylate is preferably Zn, Cd, Al and Ga, and more preferably Zn, from the viewpoint of further protecting defects in the surface of an InP quantum dot. Examples of the metal carboxylates include zinc acetate, zinc trifluoroacetate, zinc myristate, zinc oleate, and zinc benzoate.

As the metal carbamate, among the metals described above, Zn, Cd, Al and Ga are preferred, and Zn is more preferred from the viewpoint of further protecting defects in the surface of an InP-based quantum dot. Specific examples thereof include zinc dimethyldithiocarbamate, zinc diethyldithiocarbamate, zinc dibutyldithiocarbamate and zinc N-ethyl-N-phenyldithiocarbamate.

As the method for surface-treating an InP-based quantum dot, for example, a surface treatment agent may be added to the reaction solution containing the InP-based quantum dot described above. The temperature at which the surface treatment agent is added to the reaction solution containing the InP-based quantum dot is preferably 20° C. or more and 350° C. or less, more preferably 50° C. or more and 300° C. or less, from the viewpoints of controlling particle size and improving the quantum yield. The treatment time is preferably 1 minute or more and 600 minutes or less, and more preferably 5 minutes or more and 240 minutes or less. The amount of the surface treatment agent added depends on the type of the surface treatment agent, being preferably 0.01 g/L or more and 1000 g/L or less, more preferably 0.1 g/L or more and 100 g/L or less, relative to the reaction solution containing the InP-based quantum dot.

Examples of the method for adding the surface treatment agent include a method of directly adding the surface treatment agent to the reaction solution, and a method of adding the surface treatment agent dissolved or dispersed in a solvent to the reaction solution. In the method of adding the surface treatment agent dissolved or dispersed in a solvent to the reaction solution, examples of the solvent for use include acetonitrile, propionitrile, isovaleronitrile, benzonitrile, acetone, methyl ethyl ketone, methyl isobutyl ketone, acetyl acetone, acetophenone, dimethylsulfoxide, dimethylformamide, dimethylacetamide, methanol, ethanol, isopropanol, cyclohexanol, phenol, methyl acetate, ethyl acetate, isopropyl acetate, phenyl acetate, tetrahydrofuran, tetrahydropyran, diethyl ether, t-butyl methyl ether, cyclohexyl methyl ether, anisole, diphenyl ether, hexane, cyclohexane, benzene, toluene, 1-decene, 1-octadecene, triethylamine, tri-n-octylamine, and water.

The InP-based quantum dot may have a core-shell structure with a core made of InP quantum dot material, which is covered with a coating compound. On the core surface, a second inorganic material having a wider bandgap than the core is grown (shell layer) to protect defects on the core surface, etc., so that nonradiative deactivation due to charge recombination is suppressed and the quantum yield can be improved. Examples of the suitable coating compound include ZnS, ZnSe, ZnSeS, ZnTe, ZnSeTe, ZnTeS, ZnO, ZnOS, ZnSeO, ZnTeO, GaP, and GaN. The InP quantum dot material in the present specification refers to a quantum dot composed of In and P, or composed of element M in addition to In and P.

In the case of obtaining an InP-based quantum dot having a core-shell structure using InP quantum dot material as a core, which is coated with a coating compound, examples of the method of forming the coating include mixing a reaction solution containing the InP quantum dot material described above and a coating compound raw material and causing a reaction at a temperature of 200° C. or more and 330° C. or less. On this occasion, it is preferable to preheat the reaction solution containing the InP quantum dot material to 150° C. or more and 350° C. or less, preferably 200° C. or more and 330° C. or less. Alternatively, a part of the coating compound raw material (for example, a metal source such as Zn) is heated to the same temperature, and added to and mixed with a reaction solution containing the InP quantum dot material before the addition of the other coating compound raw material. The mixture is then heated to 150° C. or more and 350° C. or less, preferably 200° C. or more and 330° C. or less, and the remaining coating compound raw material may be added thereto to cause a reaction. The timing of mixing the metal source such as Zn with the reaction solution containing the InP quantum dot material is not limited to before the addition of the other coating compound raw material, and may be after the addition.

In the case where the coating compound raw material is a metal such as Zn, it is preferable to use an organic carboxylate thereof, particularly a long-chain fatty acid salt having 12 or more and 18 or less carbon atoms, from the viewpoints of controlling the particle size, controlling the particle size distribution, and improving the quantum yield. Preferred examples of the sulfur source include a straight or branched long-chain alkanethiol having 8 or more and 18 or less carbon atoms such as dodecanethiol, and a trialkylphosphine sulfide compound having 4 or more and 12 or less carbon atoms such as and trioctylphosphine sulfide. Preferred examples of the selenium source include a trialkylphosphine selenide compound having 4 or more and 12 or less carbon atoms such as trioctylphosphine selenide. Preferred examples of the tellurium source include a trialkylphosphine telluride compound having 4 or more and 12 or less carbon atoms such as trioctylphosphine telluride. These coating compound raw materials may be directly mixed with the reaction solution containing the InP quantum dot material, or may be dissolved in a solvent in advance and then mixed with the reaction solution containing the InP quantum dot material. In the case where the raw material is dissolved in a solvent in advance and then mixed, the same solvent as those used for the reaction of the phosphorus source and the indium source in the production of the InP quantum dot precursor may be used. The solvent for dissolving the coating compound raw material and the solvent in the reaction solution containing the InP quantum dot material may be the same or different.

In the case of using a metal such as zinc as the coating compound, for example, the amount of the coating compound raw material used is preferably 0.5 mol or more and 50 mol or less, more preferably 1 mol or more and 10 mol or less, relative to 1 mol of indium in a reaction solution containing the InP quantum dot material. The preferred amount of the sulfur source or selenium source used corresponds to the amount of metal described above.

In the case of a core-shell type quantum dot with a core of InP quantum dot material, which is coated with a coating compound to form a shell layer, the surface of the core-shell type quantum dot may be treated with a surface treatment agent for the purpose of increasing the quantum yield. Through the surface treatment of the surface of the core-shell type quantum dot, defects in the surface of the shell layer can be protected, so that the quantum yield can be improved. Examples of the suitable surface treatment agent include a metal-containing compound such as a metal carboxylate, a metal carbamates, a metal thiocarboxylate, a metal halide, a metal acetylacetonate and hydrates thereof, and a halogen-containing compound such as a halogenated alkanoyl compound, a halogenated quaternary ammonium compound, a halogenated quaternary phosphonium compound, a halogenated aryl compound, and a halogenated tertiary hydrocarbon compound. Among these, a metal carboxylate or a metal carbamate is preferred from the viewpoint of further improving the quantum yield.

The metal carboxylate may have a straight chain, branched chain or cyclic alkyl group having 1 or more and 24 or less carbon atoms, containing an saturated or unsaturated bond, which may be unsubstituted or substituted with a halogen atom, or may have a plurality of carboxylic acids in the molecule. Examples of the metal of the metal carboxylate include Li, Na, K, Rb, Cs, Be, Mg, Ca, Sr, Ba, Sc, Y, Ti, Zr, V, Nb, Cr, Mo, Mn, Fe, Co, Ni, Cu, Ag, Zn, Cd, Hg, B, Al, Ga, In, Tl, Ge, Sn, Pb, Sb, Bi, La, Ce and Sm. Among these, the metal of the metal carboxylate is preferably Zn, Cd, Al and Ga, and more preferably Zn, from the viewpoint of further protecting defects in the surface of an InP quantum dot. Examples of the metal carboxylates include zinc acetate, zinc trifluoroacetate, zinc myristate, zinc oleate, and zinc benzoate.

For the metal carbamate, among the metals described above, Zn, Cd, Al and Ga are preferred, and Zn is more preferred from the viewpoint of further protecting defects in the surface of an InP-based quantum dot. Specific examples thereof include zinc dimethyldithiocarbamate, zinc diethyldithiocarbamate, zinc dibutyldithiocarbamate and zinc N-ethyl-N-phenyldithiocarbamate.

As the method for surface-treating the shell layer, for example, a surface treatment agent may be added to the reaction solution containing the core-shell type quantum dot. The temperature at which the surface treatment agent is added to the reaction solution containing the core-shell type quantum dot is preferably 20° C. or more and 350° C. or less, more preferably 50° C. or more and 300° C. or less, from the viewpoints of controlling particle size and improving the quantum yield. The treatment time is preferably 1 minute or more and 600 minutes or less, and more preferably 5 minutes or more and 240 minutes or less. The amount of the surface treatment agent added depends on the type of the surface treatment agent, being preferably 0.01 g/L or more and 1000 g/L or less, more preferably 0.1 g/L or more and 100 g/L or less, relative to the reaction solution containing the core-shell type quantum dot.

Examples of the method for adding the surface treatment agent include a method of directly adding the surface treatment agent to the reaction solution, and a method of adding the surface treatment agent dissolved or dispersed in a solvent to the reaction solution. In the method of adding the surface treatment agent dissolved or dispersed in a solvent to the reaction solution, examples of the solvent for use include acetonitrile, propionitrile, isovaleronitrile, benzonitrile, acetone, methyl ethyl ketone, methyl isobutyl ketone, acetyl acetone, acetophenone, dimethylsulfoxide, dimethylformamide, dimethylacetamide, methanol, ethanol, isopropanol, cyclohexanol, phenol, methyl acetate, ethyl acetate, isopropyl acetate, phenyl acetate, tetrahydrofuran, tetrahydropyran, diethyl ether, t-butyl methyl ether, cyclohexyl methyl ether, anisole, diphenyl ether, hexane, cyclohexane, benzene, toluene, 1-decene, 1-octadecene, triethylamine, tri-n-octylamine, and water.

The InP-based quantum dot obtained by the above method has high quality with a narrow width of particle size distribution resulting from use of an InP quantum dot precursor having a sufficiently reduced content of the compound represented by Formula (2), being suitably used for a single electron transistor, a security ink, a quantum teleportation, a laser, a solar cell, a quantum computer, a biomarker, a light emitting diode, a display backlight, and a color filter.

EXAMPLES

The present invention is described in more detail with reference to Examples below, though the present invention is not limited thereto. In each of the following Examples and Comparative Examples, the water content of a solvent was controlled to 20 ppm or less on mass basis. In the following, the water content of a solvent was measured using a Carl Fisher Moisture Analyzer (MKC 610 manufactured by Kyoto Electronics).

Production Example 1: Production of Silylphosphine Compound Represented by Formula (1)

Into a reaction vessel, 189.8 kg of degassed and dehydrated toluene (water content: 20 ppm or less on mass basis) was fed, and 82 kg of triethylamine and 149.5 kg of trimethylsilyl trifluoromethanesulfonate were then fed. After purging the inside of the reaction vessel with nitrogen, the liquid temperature was adjusted to 30° C. Into the reaction vessel, 7.4 kg of phosphine gas was fed over 3 hours, and after the liquid temperature was adjusted to 35° C., aging was performed for 4 hours. The resulting 424.9 kg of reaction solution separated into two layers was left standing for 12 hours and the lower layer was separated in order to use the upper layer. In an evaporator, the upper layer was concentrated under reduced pressure to a final pressure of 6.3 KPa based on absolute pressure and a liquid temperature of 70° C. to remove low boiling content, so that 60.1 kg of a concentrated solution was obtained. The resulting concentrated solution was distilled under a reduced pressure of 0.5 kPa at a column top temperature of 85° C. After removal of the initial fraction, 49.3 kg of a main fraction was collected as a collected product. The concentration and distillation were performed in an inert atmosphere.

Through analysis by $^{31}$P-NMR under the following conditions, the collected product (liquid) was identified as tris(trimethylsilyl)phosphine (TMSP), and the purity thereof and the content of the compound represented by each of the above Formulas (2), (3), (5), (6) and (7) (R is methyl in any of them) were measured. The results are shown in the following Table 1.

Further, the content of the compound represented by Formula (4) in tris(trimethylsilyl)phosphine (R is methyl) was measured by gas chromatography analysis under the following conditions. The results are shown in the following Table 1.

$^{31}$P-NMR Measurement Conditions:

The sample to be measured was dissolved in heavy benzene at a content of 20 mass %. The resulting solution was measured with JNM-ECA500 manufactured by JEOL Ltd., under the following conditions.

Observation frequency: 202.4 MHz, pulse: 45 degrees, capture time: 5 seconds, number of integrations: 256, measurement temperature: 22° C., standard substance: 85 mass % phosphoric acid The peak area derived from the compound represented by each of Formulas (1), (2), (3), (5), (6) and (7) was determined. The amount of the compound of Formulas (1), (2), (3), (5), (6) or (7) was determined by an area percentage method for calculating the peak ratio relative to the total detected peak area as 100%.

Gas Chromatography Measurement Conditions:

A measurement sample in an amount of 0.2 μL subdivided in a container with a septum cap under an inert gas atmosphere was injected into gas chromatography (manufactured by Shimadzu Corporation, "GC-2010") with a syringe and measured under the following conditions.

Column: "DB1" manufactured by Agilent J&W (inner diameter: 0.25 mm, length: 30 m)

Injection temperature: 250° C., detector temperature: 300° C.

Detector: FID, carrier gas: He (pressure: 100 kPa)

Split ratio: 1:100

Temperature rise conditions: maintained at 50° C. for 3 minutes→temperature rise to 200° C. at a rate of temperature rise of 10° C./min→temperature rise to 300° C. at a rate of temperature rise of 50° C./min-→maintained at 300° C. for 10 minutes.

The amount of the compound of Formula (4) was determined by an area percentage method for calculating the peak ratio relative to the total detected peak area as 100%.

Comparative Production Example 1

Into a reaction vessel, 156.9 g of degassed and dehydrated diethyl ether (water content: 10 ppm or less on mass basis) was fed, and 82 g of triethylamine and 149.5 g of trimethylsilyl trifluoromethanesulfonate were then fed. After purging the inside of the reaction vessel with nitrogen, the liquid temperature was adjusted to 30° C.

Into the reaction vessel, 7.4 g of phosphine gas was fed over 3 hours, and after the liquid temperature was adjusted to 35° C., aging was performed for 4 hours.

The resulting 424.9 g of reaction solution separated into two layers was left standing for 12 hours and the lower layer was separated in order to use the upper layer. In an evaporator, the upper layer was concentrated under reduced pressure to a final pressure of 2.2 kPa and a liquid temperature of 70° C. to remove low boiling content, so that 59.1 g of a concentrated solution was obtained.

The resulting concentrated solution was distilled under a reduced pressure of 0.5 kPa at a column top temperature of 85° C. After removal of the initial fraction, 49.9 g of a main fraction was collected. The concentration and distillation were performed in an inert atmosphere.

Through analysis by $^{31}$P-NMR under the conditions described above, the purity of tris(trimethylsilyl)phosphine in the collected product was measured. The results are shown in the following Table 1. Further, as in Production Example 1, the content of the compounds represented by Formulas (2) to (7) was measured. The results are shown in Table 1.

TABLE 1

|  | TMSP (mol %) | Compound of Formula (2) (mol %) | Compound of Formula (3) (mol %) | Compound of Formula (4) (mol %) | Compound of Formula (5) (mol %) | Compound of Formula (6) (mol %) | Compound of Formula (7) (mol %) |
| --- | --- | --- | --- | --- | --- | --- | --- |
| Production Example 1 | 99.6 | 0.15 | N.D. | 0.08 | N.D. | N.D. | 0.10 |
| Comparative Production Example 1 | 98.3 | 0.35 | N.D. | 0.18 | 0.10 | 0.10 | 0.26 |

N.D. . . . Below detection limit (detection limit: less than 0.05 mol %)

Production Example 2: Production of Indium Myristate

<First Step>

Degraded indium acetate was used as a model hydroxyl group-containing indium carboxylate. Specifically, after opening a sealed container of commercially available indium acetate for use as reagent, the indium acetate was placed in a cool and dark place with a lid closed for about 100 days before use. The results of analysis using an ICP emission spectrometer (manufactured by Shimadzu Corporation) showed that the degraded indium acetate was composed of hydroxyl group-containing indium acetate represented by $In(CH_3COO)_{2.8}(OH)_{0.2}$. In a flask, 5 g of the degraded indium acetate, 160 g of acetic acid, and 9 g of acetic anhydride were placed and heated at 120° C. for 1.5 hours while refluxing. After completion of the reaction, the reaction product was separated by filtration under a nitrogen atmosphere at room temperature, subjected to repulp cleaning with dehydrated hexane (manufactured by Kanto Chemical Co., Inc.), and further subjected to vacuum drying. The IR spectra of the degraded indium acetate used as a raw material and indium acetate as reaction product are shown in FIG. 1 (*a*) and FIG. 1 (*b*). It is shown that in FIG. 1 (*a*), an absorption derived from the hydroxyl group of hydroxyl group-containing indium acetate (absorption indicated by an arrow in the Figure, in the vicinity of 1600 cm$^{-1}$) is observed, whereas in FIG. 1 (*b*), no absorption is observed. Accordingly, it is confirmed that through the first step, the hydroxyl group was removed from the hydroxyl group-containing indium acetate in the degraded indium acetate used as a raw material.

<Second Step>

In a flask, 5.1 g of indium acetate obtained in the first step and 30 g of myristic acid were placed, and heated under reduced pressure at 110° C. for 3 hours and then at 150° C. for 1 hour. The pressure of the reaction system was set to 30 Pa or less. After completion of the reaction, dehydrated acetone (manufactured by Kanto Chemical Co., Inc.) was added to the reaction system to precipitate indium myristate as reaction product. Subsequently, the reaction product was separated by filtration under a nitrogen atmosphere, subjected to repulp cleaning twice with dehydrated acetone (manufactured by Kanto Chemical Co., Inc.), subjected to rinse cleaning once with dehydrated acetone (manufactured by Kanto Chemical Co., Inc.), and further dried under reduced pressure. In this way, the target indium myristate was obtained. The IR spectrum of the indium myristate is shown in FIG. 2. As is clear from the results shown in the figure, no absorption peak derived from the hydroxyl group (in the vicinity of 1600 cm$^{-1}$) was observed in indium myristate, so that it was confirmed that no hydroxyl group was contained.

Production Example 3: Production of Indium Myristate

The degraded indium acetate used in Production Example 2 was subjected to the second step in Production Example 2, without being subjected to the first step in Production Example 2. The IR spectrum of indium myristate thus obtained is shown in FIG. 3. As is clear from the results shown in the figure, an absorption peak derived from a hydroxyl group (absorption peak indicated by arrow in the figure, in the vicinity of 1600 cm$^{-1}$) was observed in indium myristate, so that it was confirmed that the hydroxyl group was contained.

In the following, in each Example and Comparative Example, synthesis of the quantum dot precursor and synthesis of the quantum dot were performed in a nitrogen gas atmosphere.

Example 1

(1) Synthesis of InP Quantum Dot Precursor

To 106.9 g of 1-octadecene, 2.7 mmol (2.15 g) of indium myristate obtained in Production Example 2 was added, and the mixture was heated to 120° C. while stirring under reduced pressure and degassed for 90 minutes. After degassing, the mixture was cooled to 60° C. to obtain a 1-octadecene solution of indium myristate. Separately, 1.5 mmol (0.38 g) of tris(trimethylsilyl)phosphine (TMSP) obtained in Production Example 1 was added to 3.38 g of trioctylphosphine to obtain a trioctylphosphine solution of TMSP. While keeping the 1-octadecene solution of indium myristate at a temperature of 60° C., the trioctylphosphine solution of TMSP was added thereto. While stirring, the mixture was heated to 100° C. in 10 minutes and then held at the temperature for 60 minutes to obtain a yellow liquid containing InP magic size clusters. The UV-VIS spectrum of the resulting liquid containing the InP quantum dot precursor was measured by the following method. The resulting spectrum is shown in FIG. 4.

(Uv-Vis Spectrum)

A UV-VIS spectrum having a measurement wavelength of 300 nm or more and 800 nm or less was measured at room temperature with an ultraviolet-visible spectrophotometer (UV-2910, manufactured by Hitachi High-Technologies Corporation). A sample solution was prepared by diluting each sample with hexane such that the amounts of phosphorus atoms and indium atoms in 100 g thereof were in the range of 0.02 mmol or more and 0.3 mmol or less, respectively.

(2) Synthesis of InP Quantum Dot

A half amount of the liquid containing the InP quantum dot precursor obtained in (1) described above was added at once to 8.9 g of 1-octadecene which had been degassed, dehydrated and then heated to 280° C. The reaction solution was heated to 300° C. in 2 minutes and then held at the same temperature for 2 minutes to obtain a red liquid containing an InP quantum dot. The UV-VIS spectrum of the liquid containing the resulting InP quantum dot was measured. The resulting spectrum is shown in FIG. 5.

(3) Synthesis of InP/ZnSeS Quantum Dot

To 6.7 g of 1-octadecene, 1.6 mmol of zinc myristate was added. The mixture was heated to 120° C. while stirring under reduced pressure and degassed for 90 minutes to obtain a 1-octadecene solution of zinc myristate. Separately, the liquid containing the InP quantum dot obtained in (2) described above was heated to 120° C. The resulting 1-octadecene solution of zinc myristate was added to the solution containing the InP quantum dot heated to 120° C., and the mixture was stirred as it was under reduced pressure at 120° C. for 15 minutes. The reaction solution was heated to 210° C. and 6.0 mmol of trioctylphosphine was added thereto. The mixture was stirred at 210° C. for 10 minutes. The mixture was further heated to 300° C., and 0.24 mmol of trioctylphosphine selenide and 1.0 mmol of trioctylphosphine sulfide were added thereto. The mixture was kept at 300° C. for 30 minutes while stirring. After cooling to room temperature, impurities were removed by centrifugation to obtain a 1-octadecene dispersion of an InP/ZnSeS quantum dot having an core of InP and a shell of ZnSe and ZnS in a supernatant. After addition of acetone to the dispersion, the mixture was stirred, and then an InP/ZnSeS quantum dot was collected as a precipitate by centrifugation. The collected InP/ZnSeS quantum dot was suspended in hexane to obtain a hexane dispersion of purified InP/ZnSeS quantum dot. The maximum fluorescence wavelength, the FWHM value, and the quantum yield of the resulting InP/ZnSeS quantum dot were measured by the following methods. The results are shown in Table 2.

(Maximum Fluorescence Wavelength and FWHM Value)

The resulting hexane dispersion was measured with a spectrofluorometer (F-7000, manufactured by Hitachi High-Tech Science Corporation) under measurement conditions at an excitation wavelength of 450 nm and a measurement wavelength range of 400 nm or more and 800 nm or less.

(Quantum Yield)

The resulting hexane dispersion was measured with an absolute PL quantum yield measuring device (C11347-01, manufactured by Hamamatsu Photonics K. K.) under measurement conditions at an excitation wavelength of 450 nm and a measurement wavelength in a range of 300 nm or more and 950 nm or less.

Example 2

An InP/ZnSeS quantum dot was obtained in the same manner as in Example 1 except that the indium myristate obtained in Production Example 3 was used as the indium source. Also in Example 2, in the UV-VIS spectrum of a liquid containing the InP quantum dot precursor, a shoulder was observed in the range of 300 nm or more and 460 nm or less, and in the UV-VIS spectrum of the liquid containing the InP quantum dot precursor heated to 300° C., a peak was observed in the range of 450 nm or more and 550 nm or less.

The maximum fluorescence wavelength, the FWHM value, and the quantum yield of the resulting InP/ZnSeS quantum dot were measured. The results are shown in Table 2.

Example 3

(1) Synthesis of InP Quantum Dot Precursor

To 18.0 g of 1-octadecene, 1.8 mmol (1.43 g) of indium myristate obtained in Production Example 2 was added, and the mixture was heated to 120° C. while stirring under reduced pressure so as to be degassed for 90 minutes. After degassing, the mixture was cooled to 65° C. to obtain a 1-octadecene solution of indium myristate. Separately, 1.0 mmol (0.25 g) of tris(trimethylsilyl)phosphine (TMSP) obtained in Production Example 1 was added to 2.25 g of trioctylphosphine to obtain a trioctylphosphine solution of TMSP. To the 1-octadecene solution of indium myristate kept at 65° C., the trioctylphosphine solution of TMSP was added. The temperature was maintained for 30 minutes to obtain a yellowish green liquid containing the InP quantum dot precursor. The resulting spectrum is shown in FIG. 6.

(2) Synthesis of InP Quantum Dot

A red liquid containing an InP quantum dot was obtained in the same manner as in Example 1 except that the InP quantum dot precursor obtained in (1) described above was used as the quantum dot precursor. The UV-VIS spectrum of the liquid containing the resulting InP quantum dot was measured. The resulting spectrum is shown in FIG. 7.

(3) Synthesis of InP/ZnSeS Quantum Dot

A hexane dispersion of an InP/ZnSeS quantum dot was obtained in the same manner as in Example 1 except that the InP quantum dot obtained in (2) described above was used as the quantum dot to make the core. The maximum fluorescence wavelength, the FWHM value, and the quantum yield of the resulting InP/ZnSeS quantum dot were measured. The results are shown in Table 2.

Example 4

Surface Treatment of InP Quantum Dot

Until an InP quantum dot was obtained, the same method was employed as in Example 1. To the resulting solution containing the InP quantum dot, zinc acetic anhydride (manufactured by Sigma-Aldrich) was added at a concentration of 3 g/L to perform surface treatment at 230° C. for 190 minutes. The solution containing a surface-treated InP quantum dot was thus obtained.

Synthesis of InP/ZnSeS Quantum Dot

To 6.7 g of 1-octadecene, 1.6 mmol of zinc myristate was added. The mixture was heated to 120° C. while stirring under reduced pressure and degassed for 90 minutes to obtain a 1-octadecene solution of zinc myristate. Separately, a liquid containing the surface-treated InP quantum dot obtained as described above was heated to 120° C. The resulting 1-octadecene solution of zinc myristate was added to a solution containing surface-treated InP quantum dot heated to 120° C., and the mixture was stirred as it was under reduced pressure at 120° C. for 15 minutes. To the reaction mixture heated to 210° C., 6.0 mmol of trioctylphosphine was added, and the mixture was stirred at 210° C. for 10 minutes. To the mixture further heated to 300° C., 0.24 mmol of trioctylphosphine selenide and 1.0 mmol of trioctylphosphine sulfide were added, and kept at 300° C. for 30 minutes while stirring. After cooling to room temperature, impurities were removed by centrifugation to obtain a 1-octadecene dispersion of InP/ZnSeS quantum dot having a core of InP and a shell of ZnSe and ZnS in the supernatant. Acetone was added to the dispersion, and after stirring of the mixture, an InP/ZnSeS quantum dot was collected as a precipitate by centrifugation. The collected InP/ZnSeS quantum dot was suspended in hexane to obtain a hexane dispersion of purified InP/ZnSeS quantum dot. The maximum fluorescence wavelength, the FWHM value, and the quantum yield of the resulting InP/ZnSeS quantum dot were measured. The results are shown in Table 2.

Example 5

Until the liquid containing the surface treated InP quantum dot was obtained, the same method as in Example 4 was employed.

Synthesis of InP/ZnSeS Quantum Dot

To 6.7 g of 1-octadecene, 1.6 mmol of zinc myristate was added. The mixture was heated to 120° C. while stirring under reduced pressure and degassed for 90 minutes to obtain a 1-octadecene solution of zinc myristate. Separately, a liquid containing the surface-treated InP quantum dot obtained as described above was heated to 120° C. The resulting 1-octadecene solution of zinc myristate was added to a solution containing surface-treated InP quantum dot heated to 180° C. The reaction solution was heated while stirring, and stirred at 210° C. for 15 minutes. To the reaction solution at 210° C. as it was, 6.0 mmol of trioctylphosphine was added, and the mixture was stirred at 210° C. for 10 minutes. To the mixture further heated to 320° C., 0.24 mmol of trioctylphosphine selenide and 1.0 mmol of trioctylphosphine sulfide were added, and kept at 320° C. for 25 minutes while stirring, so that a liquid containing an InP/ZnSeS quantum dot was obtained.

Surface Treatment of InP/ZnSeS Quantum Dot

To the resulting solution containing the InP/ZnSeS quantum dot, zinc acetic anhydride was added at a concentration of 3 g/L to perform surface treatment at 230° C. for 90 minutes, and 1-dodecanethiol dissolved at a concentration of 60 g/L in toluene was added as a ligand. The mixture was stirred at 230° C. as it was for 60 minutes to obtain a solution containing a surface-treated InP/ZnSeS quantum dot. After cooling to room temperature, impurities were removed by centrifugation to obtain a 1-octadecene dispersion of the surface treated InP/ZnSeS quantum dot in the supernatant. Acetone was added to the dispersion, and after stirring of the mixture, an InP/ZnSeS quantum dot was collected as a precipitate by centrifugation. The collected InP/ZnSeS quantum dot was suspended in hexane to obtain a hexane dispersion of purified InP/ZnSeS quantum dot. The maximum fluorescence wavelength, the FWHM value, and the quantum yield of the resulting InP/ZnSeS quantum dot were measured. The results are shown in Table 2.

Comparative Example 1

An InP/ZnSeS quantum dot was obtained in the same manner as in Example 1 except that TMSP obtained in Comparative Production Example 1 was used as the phosphorus source. The maximum fluorescence wavelength, the FWHM value, and the quantum yield of the resulting InP/ZnSeS quantum dot were measured. The results are shown in Table 2.

Comparative Example 2

An InP/ZnSeS quantum dot was obtained in the same manner as in Example 1 except that TMSP obtained in Comparative Production Example 1 was used as the phosphorus source, and indium myristate obtained in Production Example 3 was used as the indium source. The maximum fluorescence wavelength, the FWHM value, and the quantum yield of the resulting InP/ZnSeS quantum dot were measured. The results are shown in Table 2.

Comparative Example 3

An InP/ZnSeS quantum dot was obtained in the same manner as in Example 3 except that TMSP obtained in Comparative Production Example 1 was used as the phosphorus source. The maximum fluorescence wavelength, the FWHM value, and the quantum yield of the resulting InP/ZnSeS quantum dot were measured. The results are shown in Table 2.

TABLE 2

|  | Maximum fluorescence wavelength (nm) | FWHM value (nm) | Quantum yield (%) |
| --- | --- | --- | --- |
| Example 1 | 577 | 48 | 53 |
| Example 2 | 532 | 50 | 51 |
| Example 3 | 578 | 44 | 56 |
| Example 4 | 571 | 46 | 79 |
| Example 5 | 574 | 44 | 93 |
| Comparative Example 1 | 589 | 56 | 48 |
| Comparative Example 1 | 547 | 57 | 52 |
| Comparative Example 1 | 592 | 51 | 50 |

As shown in Table 2, the quantum dots obtained in Examples 1 to 3 have a smaller FWHM value than the quantum dots obtained in Comparative Examples 1 to 3. It can be therefore seen that a high-quality InP-based quantum dot with a narrow width of particle size distribution can be obtained by using TMSP with only a small amount of specific impurities in the production of a quantum dot precursor. In particular, in comparison between Examples 1 and 2 in which TMSP with specific impurities in an amount equal to or less than a specific value was used, the FWHM value was greatly reduced by 2 nm by using indium myristate with no absorption peak derived from a hydroxyl group observed. In contrast, in comparison between Comparative Examples 1 and 2 in which TMSP with specific impurities in an amount more than the upper limit of the present invention was used, the effect of reducing FWHM value by using indium myristate with no absorption peak derived from a hydroxyl group observed was only 1 nm. It can be therefore seen that in the present invention, by using a silylphosphine compound with an amount of specific impurities equal to or less than a specific amount and indium carboxylate with no absorption peak derived from a hydroxyl group observed, the width of the particle size distribution can be synergistically narrowed. It can be also seen that the quantum yield was improved in Examples 4 and 5 in which the surface treatment was performed.

The invention claimed is:

1. A method for producing an InP quantum dot precursor from a phosphorus source and an indium source, wherein a silylphosphine compound represented by the following Formula (1) with a content of a compound represented by the following Formula (2) of 0.3 mol % or less:

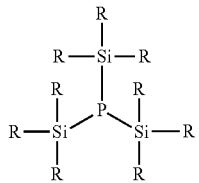
(1)

wherein each R is independently an alkyl group having 1 or more and 5 or less carbon atoms or an aryl group having 6 or more and 10 or less carbon atoms,

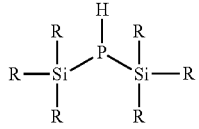
(2)

wherein R is the same as in Formula (1) is used as the phosphorus source.

2. The method for producing an InP quantum dot precursor according to claim 1, wherein a silylphosphine compound represented by the Formula (1) with a content of a compound represented by the following Formula (3) of 0.1 mol % or less:

(3)

wherein R is the same as in Formula (1) is used as the phosphorus source.

3. The method for producing an InP quantum dot precursor according to claim 1, wherein a silylphosphine compound represented by the Formula (1) with a content of a compound represented by the following Formula (4) of 0.5 mol % or less:

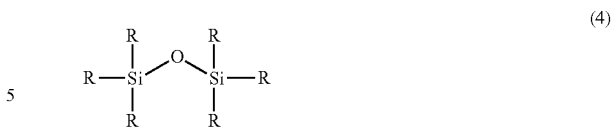
(4)

wherein R is the same as in Formula (1) is used as the phosphorus source.

4. The method for producing an InP quantum dot precursor according to claim 1, wherein a silylphosphine compound represented by the Formula (1) with a content of a compound represented by the following Formula (5) of 0.05 mol % or less:

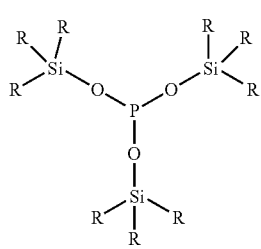
(5)

wherein R is the same as in Formula (1) is used as the phosphorus source.

5. The method for producing an InP quantum dot precursor according to claim 1, a silylphosphine compound represented by the Formula (1) with a content of a compound represented by the following Formula (6) of 0.05 mol % or less:

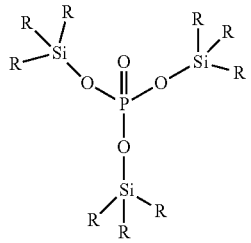
(6)

wherein R is the same as in Formula (1) is used as the phosphorus source.

6. The method for producing an InP quantum dot precursor according to claim 1, wherein a silylphosphine compound represented by Formula (1) with a content of a compound represented by the following Formula (7) of 0.2 mol % or less:

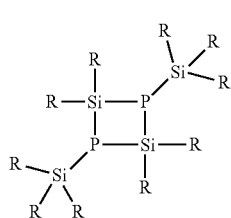
(7)

wherein R is the same as in Formula (1)
is used as the phosphorus source.

7. The method for producing an InP quantum dot precursor according to claim 1, wherein at least one selected from the group consisting of indium acetate, indium laurate, indium myristate, indium palmitate, indium stearate and indium oleate is used as the ndium source.

8. The method for producing an InP quantum dot precursor according to claim 1, wherein an indium carboxylate with no absorption peak derived from a hydroxyl group observed in the range of 1500 cm$^{-1}$ or more and 1700 cm$^{-1}$ or less in IR spectrum is used as the indium source.

9. The method for producing an InP quantum dot precursor according to claim 1, wherein a reaction between the phosphorus source and the indium source is performed at a temperature in the range of 20° C. or more and 150° C. or less.

10. The method for producing an InP quantum dot precursor according to claim 1, wherein the reaction between the phosphorus source and the indium source is performed in an organic solvent.

11. The method for producing an InP quantum dot precursor according to claim 1, wherein the reaction between the phosphorus source and the indium source is performed in the presence of a trialkylphosphine.

12. A method for producing an InP-based quantum dot comprising heating an InP quantum dot precursor obtained by the method according to claim 1 to a temperature of 200° C. or more and 350° C. or less to obtain an InP quantum dot.

13. A method for producing an InP-based quantum dot comprising heating an InP quantum dot precursor obtained by the method according to claim 1 together with a compound containing an element source M (M is at least one selected from the group consisting of Be, Mg, Ca, Mn, Cu, Zn, Cd, B, Al, Ga, N, As, Sb and Bi) other than a phosphorous source and an indium source to a temperature of 200° C. or more and 350° C. or less to obtain a composite quantum dot of In, P and M.

14. A method for producing an InP-based quantum dot comprising surface treating a quantum dot obtained by the method according to claim 12 with a metal-containing compound or a halogen-containing compound.

15. The method for producing an InP-based quantum dot according to claim 14, wherein the quantum dot is surface treated with the metal-containing compound, wherein the metal-containing compound is a metal carboxylate.

16. A method for producing an InP-based quantum dot, wherein a quantum dot obtained by the method according to claim 12 is used as a core, and the core is coated with a coating compound other than InP to obtain a quantum dot having a core-shell structure.

17. A method for producing an InP-based quantum dot, wherein a quantum dot having a core-shell structure obtained by the method according to claim 16 is further surface treated with a metal-containing compound or a halogen containing compound.

18. The method for producing an InP-based quantum dot according to claim 17, wherein the quantum dot is surface treated with the metal-containing compound, wherein the metal-containing compound is a metal carboxylate.

* * * * *